(12) United States Patent
DeGroote et al.

(10) Patent No.: US 8,504,988 B2
(45) Date of Patent: Aug. 6, 2013

(54) LIVE COMPONENT AUTHORING SYSTEM

(75) Inventors: David Glenn DeGroote, Ashburn, VA (US); David G. Grossman, Herndon, VA (US)

(73) Assignee: Duiloe Mgmt. Limited Liability Company, Wilmington, DE (US)

( * ) Notice: Subject to any disclaimer, the term of this patent is extended or adjusted under 35 U.S.C. 154(b) by 1000 days.

(21) Appl. No.: 11/376,299

(22) Filed: Mar. 16, 2006

(65) Prior Publication Data

US 2006/0184915 A1    Aug. 17, 2006

Related U.S. Application Data

(63) Continuation of application No. 09/840,055, filed on Apr. 24, 2001, now Pat. No. 7,076,763.

(60) Provisional application No. 60/199,133, filed on Apr. 24, 2000.

(51) Int. Cl.
*G06F 9/44* (2006.01)

(52) U.S. Cl.
USPC .......................................................... 717/117

(58) Field of Classification Search
USPC ..... 717/148, 107, 117, 112; 709/225; 700/49; 705/52; 706/10; 715/205; 707/513
See application file for complete search history.

(56) References Cited

U.S. PATENT DOCUMENTS

| | | | |
|---|---|---|---|
| 5,510,998 A | 4/1996 | Woodruff et al. | |
| 6,073,232 A | 6/2000 | Kroeker et al. | |
| 6,083,276 A * | 7/2000 | Davidson et al. | 717/107 |
| 6,141,012 A | 10/2000 | Bollman et al. | |
| 6,157,946 A | 12/2000 | Itakura et al. | |
| 6,216,138 B1 | 4/2001 | Wells et al. | |
| 6,546,397 B1 * | 4/2003 | Rempell | 1/1 |
| 6,654,725 B1 | 11/2003 | Langheinrich et al. | |
| 6,715,109 B1 | 3/2004 | Charlet et al. | |
| 6,751,778 B1 * | 6/2004 | Broman et al. | 715/205 |
| 6,792,399 B1 | 9/2004 | Phillips et al. | |
| 7,076,763 B1 | 7/2006 | DeGroote et al. | |
| 2002/0007409 A1 | 1/2002 | Rode | |
| 2002/0049788 A1 * | 4/2002 | Lipkin et al. | 707/513 |

OTHER PUBLICATIONS

W3C, "Mathematical Markup Language (MathML) Version 2.0", Feb. 2000, as file MathML2.0.pdf, from htttp://www.w3.org/TR/2000/WD-MathML2-20000211/PDF-p-MathML-20000211.pdf>.*
W3C, "Mathematical Markup Language (MathML) Ha-Le 2.0", Feb. 2000, (herein MathML2.0—chapter. 3 URL: htttp://www.w3.org/TR/2000/WD-MathML2-20000211/PDF-p-MathML-20000211.pdf<MathML2.0_ch3.pdf>.*

(Continued)

*Primary Examiner* — Tuan A Vu
(74) *Attorney, Agent, or Firm* — Perkins Coie LLP

(57) ABSTRACT

Disclosed is a rules based editor configured to edit an equation related element where the rules based editor may use at least one rule related to a pre-built application module that is included in a viewer module. The viewer module may include rendering and equation evaluation instructions. The edited equation related element may be configured to be included in a component description file. The combination of the viewer module and the component description file may be configured to be used to display a version of the equation related element that is analytically related to an input value.

31 Claims, 36 Drawing Sheets

OTHER PUBLICATIONS

W3C, "Mathematical Markup Language (MathML) Version 2.0", Feb. 2000 (herein MathML2.0—pp. 1-342 <MathML2_20000211.pdf>.*

Wang, "Design and Protocol for Internet Accessible Mathematical Computation", *ACM*, (1999),pp. 291-298.

Le, et al., "Client-Server Communication Standards for Mathematical Computation", *ACM*, (1999),pp. 299-305.

Wright, "Interactive Mathematics via the Web using MathM", *ACM Press*, (Jun. 2000),pp. 49-57.

"Mathematical Markup Language (MathML.TM.) 1.01 Specification", http://www.w3.org; W3C; Abstract,(1999),2 pages.

"WebEQ Equation Rendering: A Simpler Way to Include Mathematics in Web Pages", *Geometry Center Home Page*, retrieved from <http://web.mit.edu/javalib/src/WebEQ/welcome.html>, (Apr. 1996).

"Geometry Technology, "Press Release: WebEQ Sale"", *Geometry Technology*, Inc., (Apr. 1996).

"Design Science, "WebEQ Interactive Math on the Web"", *Design Science, Inc.*, retrieved from <http://www.dessci.com/en/products/webeq> Copyright,(1996-2004).

* cited by examiner

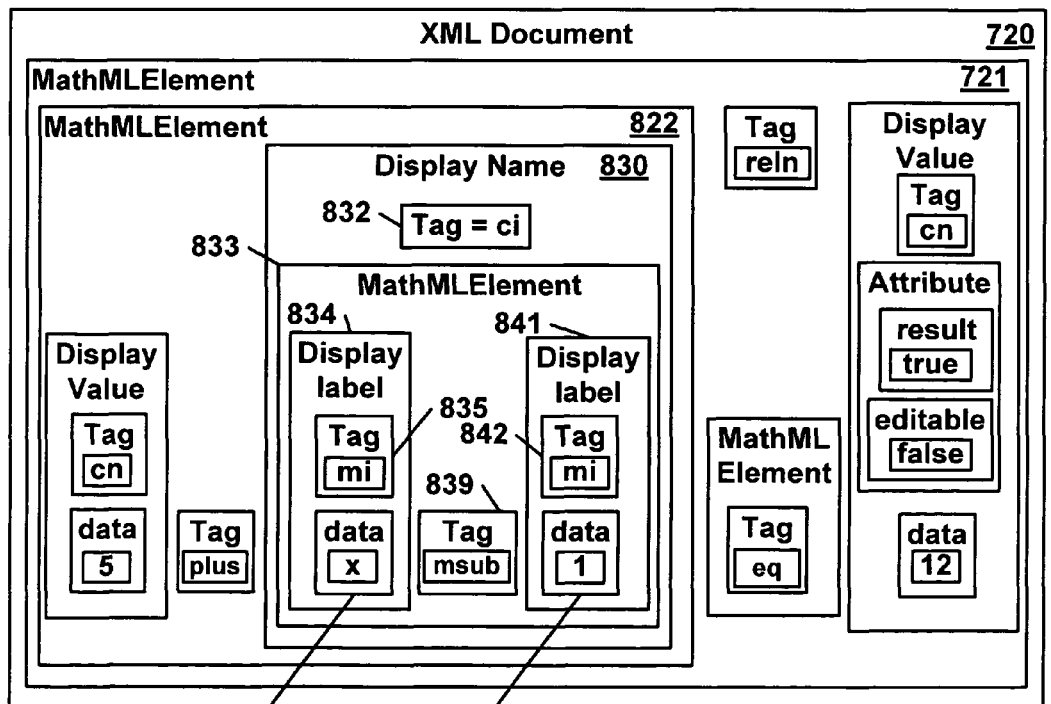

| Equations.Conversions.Conversion.java | 1300 | static public Conversion getConversion( String displayTypeName,
    String valueTypeName,
    String displayFormatName)

| Equations.Conversions.string.Conversion_string.java | 1310 |

// Convert String to Value
abstract public void toValue(Value value, String data);

// Convert Value to String
abstract public String fromValue(Value value);

// Get a conversion to String from the given value type and
// display format
static public Conversion getConversion( String valueTypeName,
    String displayFormatName)

| Equations.Conversions.string.real.Conversion_double.java | 1320 |

// Convert a String to a double
abstract public double toValue(String string);

// Convert a double to a String
abstract public String fromValue(double data);

// Convert String to Value
public void toValue(Value value, String data)
  { ((Value_real)value).setValue(toValue(data)); }

// Convert Value to String
public String fromValue(Value value)
  { return fromValue(((Value_real)value).getValue()); }

| Equations.Conversions.string.real.Conversion_Binary.java | |
| // Convert double to binary String | 1330 | public String fromValue(double data)
  {return Long.toBinaryString(Double.doubleToLongBits(data)); }

// Convert binary String to double
public double toValue(String string)
  {return Double.longBitsToDouble(Long.valueOf(string,2).longValue());
}

| Equations.Conversions.string.real.Conversion_FloatingPoint.java |

// Convert double to Floating Point String
public String fromValue(double data) {.....}

// Convert Floating Point String to double
| public double toValue(String string) {.....} | 1340 |

FIG. 13

LIVE COMPONENT AUTHORING SYSTEM

CROSS-REFERENCE TO RELATED APPLACATIONS

The present application is a continuation of U.S. Pat. No. 7,076,763 filed Apr. 24, 2001, entitled "Live Component System," which claims the benefit of provisional patent application Serial No. 60/199,133 to DEGROOTE et al., filed on Apr. 24, 2000, entitled "Live Component System," which is hereby incorporated by reference.

TECHNICAL FIELD

The live component authoring system relates generally to the field of Web application development. More specifically, to the development of interactive live components for inclusion on web pages.

BACKGROUND

Displaying and storing mathematics electronically has been of interest to the academic and publishing industries for years. Solutions to this problem including: TeX; LaTeX; and MS Equation; allow a user to specify, through a series of commands, how to display a mathematical equation.

Calculating mathematics electronically has also been of interest to the engineering, financial and consumer markets for many years. Solutions to this problem have included handheld calculators, custom programs, and generalized calculation programs.

Handheld calculators such as those manufactured by Hewlett Packard Inc. of Palo Alto, Calif. and Texas Instruments of Dallas, Tex. allow a user to punch a series of key commands to perform a calculation. Some calculators are programmable, wherein the calculation sequences may be automated. Unfortunately, these programs will only run the specific calculator or simulators and are constrained by the small display often associated with a handheld calculator.

Custom programs, written by programmers, allow very application specific calculations and displays to be performed by a user. These programs require the combined skill of a programmer and one skilled in the calculation or algorithm being programmed.

Generalized calculation programs often include programs that make it easy for a person to customize a specific class of calculations such as financial and math calculations. An example of a program like this includes Excel by Microsoft Inc. of Redmond, Wash.

Another type of generalized calculation program is designed to perform math calculations using symbolic computational systems. This type of program allows a user to describe a mathematics equation symbolically and may generate symbolic and/or numeric results. Some examples of programs like these include: MathCAD by Mathsoft, Inc. of Cambridge, Mass.; MatLAB by The Mathworks, Inc. of Natick, Mass.; Maple by Waterloo Maple Inc. of Waterloo, Ontario, Canada; and Mathmatica by Wolfram Research, Inc. of Champlaign, Ill. None of these programs can generate live calculations that can operate on a generic browser or operate on non-numeric data types with string based or web enhanced live calculations.

With the advent of the World Wide Web, several viewers have been developed that allow non-live mathematics to be displayed. Methods for achieving live calculations have included custom programming on either the server side of the web connection or as an applet or script file on the client side. These solutions require that the web developer be a skilled programmer, putting this kind of function out of reach for many developers.

A live component authoring system can be utilized to produce live components that can not only perform calculations, but can also link web pages and embedded systems. A generalized program allows nonprogrammers to design interactive systems containing live components that may include generic computers running web browsers, embedded systems comprising dedicated hardware, network hardware, and server hardware.

The live component authoring system can be utilized to generate live components for use on target systems, wherein the target systems may include browsers and embedded systems. Preferably, this system will be capable of operating on a multitude of data types (numeric and non-numeric), be useable by non-programmer developers, and produce code that is efficient, small, and fast.

One advantage of the invention is that it generates live components for use on target systems, wherein the target systems may include browsers and embedded systems.

Another advantage of this invention is that is capable of operating on a multitude of data types including both numeric and non-numeric data types.

Yet a further advantage of this invention is that it may be useable by non-programmer application developers.

Yet another advantage of this invention is that it may scale the live components, to produce efficient code that is small and fast.

Yet another advantage of this invention is that it's live component description file may use standard file formats such as XML.

To achieve the foregoing and other advantages, in accordance with all of the invention as embodied and broadly described herein, an apparatus for generating a live component comprising a resource library, a live component editor for allowing a user to edit the live component utilizing resources from the resource library, a library of pre-built application modules, a viewer generator for creating a live component viewer from the pre-built application modules directed by the live component editor, and a component description generator for creating a live component description file directed by the live component editor. The live component editor may include a live component simulator capable of simulating the live component.

In yet a further aspect of the invention, the live component may be downloaded from a server to a local system, wherein algorithms in the live component are executed on the local system. The pre-built application modules and live component viewer may include computer executable instructions such as compiled code, assembled code, and interpreted script.

In yet a further aspect of the invention, the live component description file may includes live component viewer instructions. The live component viewer instructions may include XML, data links, mathML, mathML extensions. The live MathML extensions may comprises a bi-directional equals operator, an edit attribute indicating if a value is editable, and a display attribute indicating a name and format for a display.

A further aspect of the invention, the resource library may include rules, definitions, default values, and resources.

In yet a further aspect of the invention, a method for generating a live component comprising the steps of: opening an initial live component with a live component editor; iteratively updating the live component by; selecting an operand for modification; selecting a step from the group of steps consisting of: modifying the properties of the selected operand; and inserting an additional operation, selected from a library of pre-built application modules that operates on the operand using predetermined rules that correspond to the additional operation; saving the modified live component by: creating a live component viewer using the pre-built application modules directed by the rules based editor; and creating a live component description file directed by the rules based editor. The initial live component may be a default live component. The method may further include downloading the live component from a server to a local system, wherein algorithms in the live component are executed on the local system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

FIG. 8A shows an example equation containing a variable.

FIG. 8B shows a MathML representation of a example equation containing a variable.

FIG. 8C shows an internal representation of a example equation containing a variable as per the present invention.

FIG. 13 is a conversion subclass hierarchy diagram.

DETAILED DESCRIPTION OF EMBODIMENTS

Figure 1:
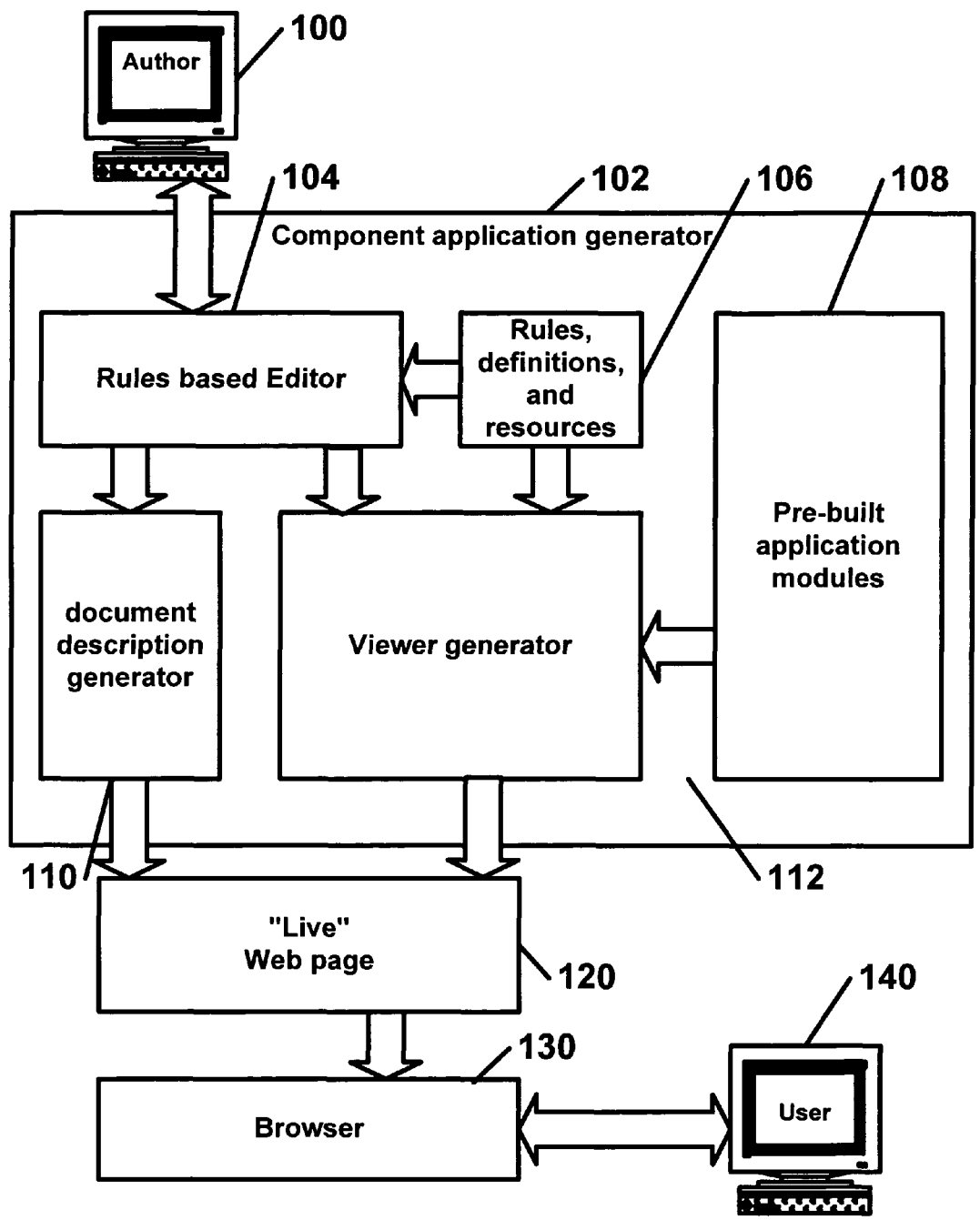
FIG. 1 is a block diagram of a live component system.

We will now make reference to the drawings. FIG. 1 is a block diagram of a live component system. This live component system block diagram illustrates an embodiment of the present invention including component authoring, publishing and end use. An author 100 uses a component application generator 102 to create "live" components that may be made part of a web page 120 which may then be accessed by a user 140 through a browser 130. The author 100 inputs data into a rules based live components editor 104 that uses rules, definitions, and resources 106 to output component descriptions to a component description generator 110 and a viewer generator 112. Rules may specify information for creating live components. These rules may be specified globally for a live component, or for any subcomponent of a live component. Examples of rules may include operations, parameters, display information, types of values, hierarchy structures, decorations, and where various operators may be located in the layout. A decoration may define additional non-functional visual aspects of a live component. The component description generator 110 may generate a component description which may be XML that may be output to a web page 120. The viewer generator 112 may accept input from the rules, definitions, and resources 106, the rules based editor 104, and pre-built application modules 108. The viewer generator 112 then creates viewer module(s) which may be included in a web page(s) 120. Now the user 140 may view the web page 120 with its live components through a browser 130.

Figure 2:
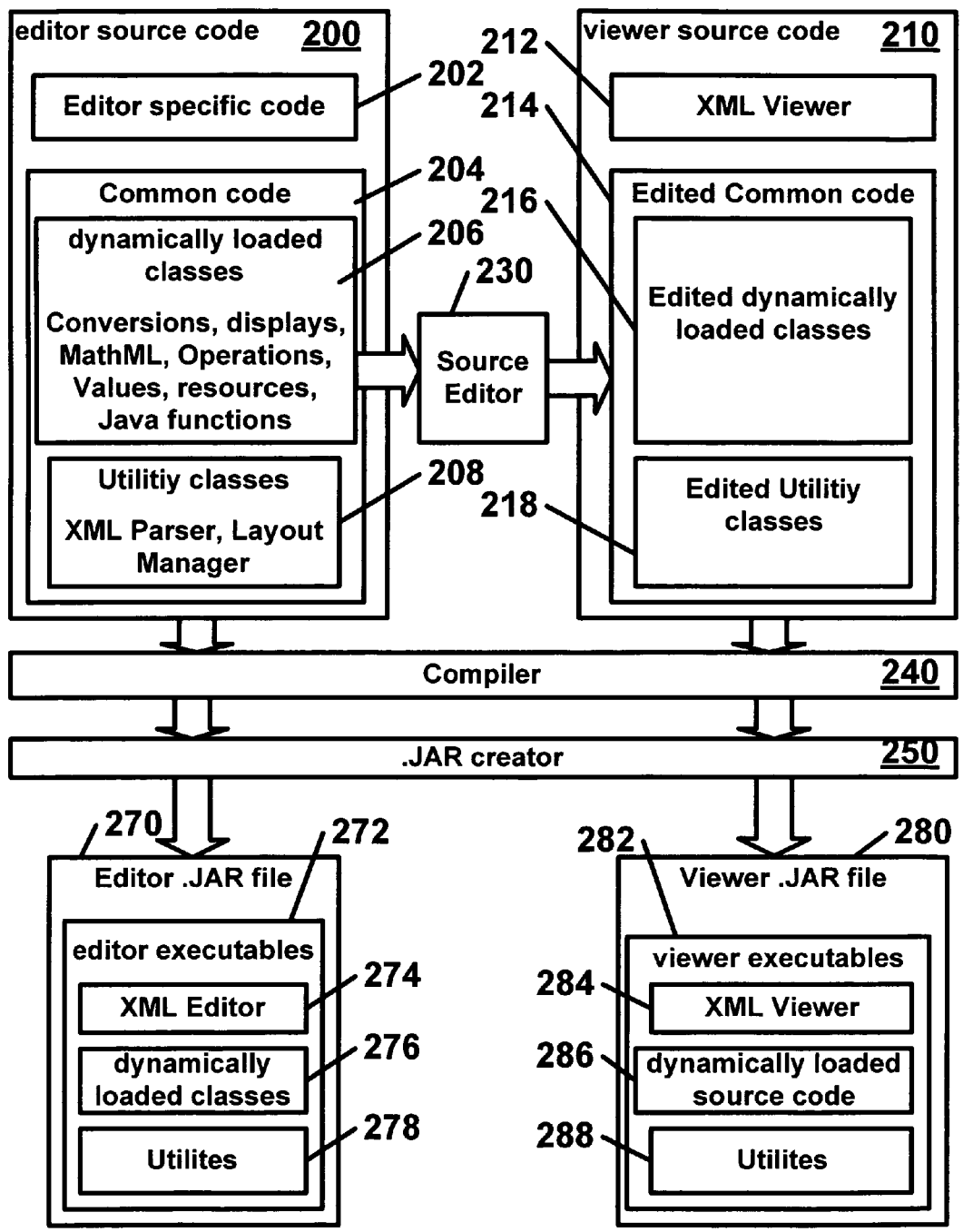
FIG. 2 is a block diagram of a live component pre-built module developer's environment for an embodiment of the invention.

FIG. 2 is a block diagram of a live component pre-built module developer's environment for an embodiment of the invention. The purpose of the developer's environment is to create files for distribution to a web designer (270 and 280). The developer's environment may include editor source code 200, viewer source code 210, a source editor 230, a compiler 240, and a JAR file creator 250. The editor source code 200 further includes editor specific code 202 and common code 204. The editor specific code may include an XML editor and a property editor. The common code 204 may include dynamically loaded classes 206 and utility classes 208 that may be shared with the viewer. The dynamically loaded classes 206 may include conversions, displays, XML specific tag functions, operations, values, resources, and Java functions. The utility classes 208 may include an XML parser and layout manager.

A source editor 230 accepts as input the common code 204 from the editor source code 200 and generates edited common code 214 to be included as part of the viewer source code 210. The edited common code may have functionality of common code 214 removed or new functionality added. For example, the ability to edit a live component may be removed from edited common code 214. The edited common code 214 may further include edited dynamically loaded classes 216 and edited utility classes 218. The viewer source code 210 may also include XML viewer code 212.

A compiler 240 may compile source code into executable modules and accepts as input editor source code 200 and viewer source code 210. The executable modules compiled by the compiler 240 are output to a .JAR creator 250 which assembles the collection of executable modules into an editor .JAR file 270 and a viewer .JAR file 280. The editor .JAR file 270 includes editor executables 272 that may further include a compiled XML editor 274, dynamically loaded classes 276, and utilities 278. The viewer .JAR file 280 includes viewer executables 282 that may further include a compiled XML viewer 284, dynamically loaded classes 286, and utilities 288. The editor .JAR file 270 and the viewer .JAR file 280 may be distributed to web designers for use in creating live components.

Figure 3:
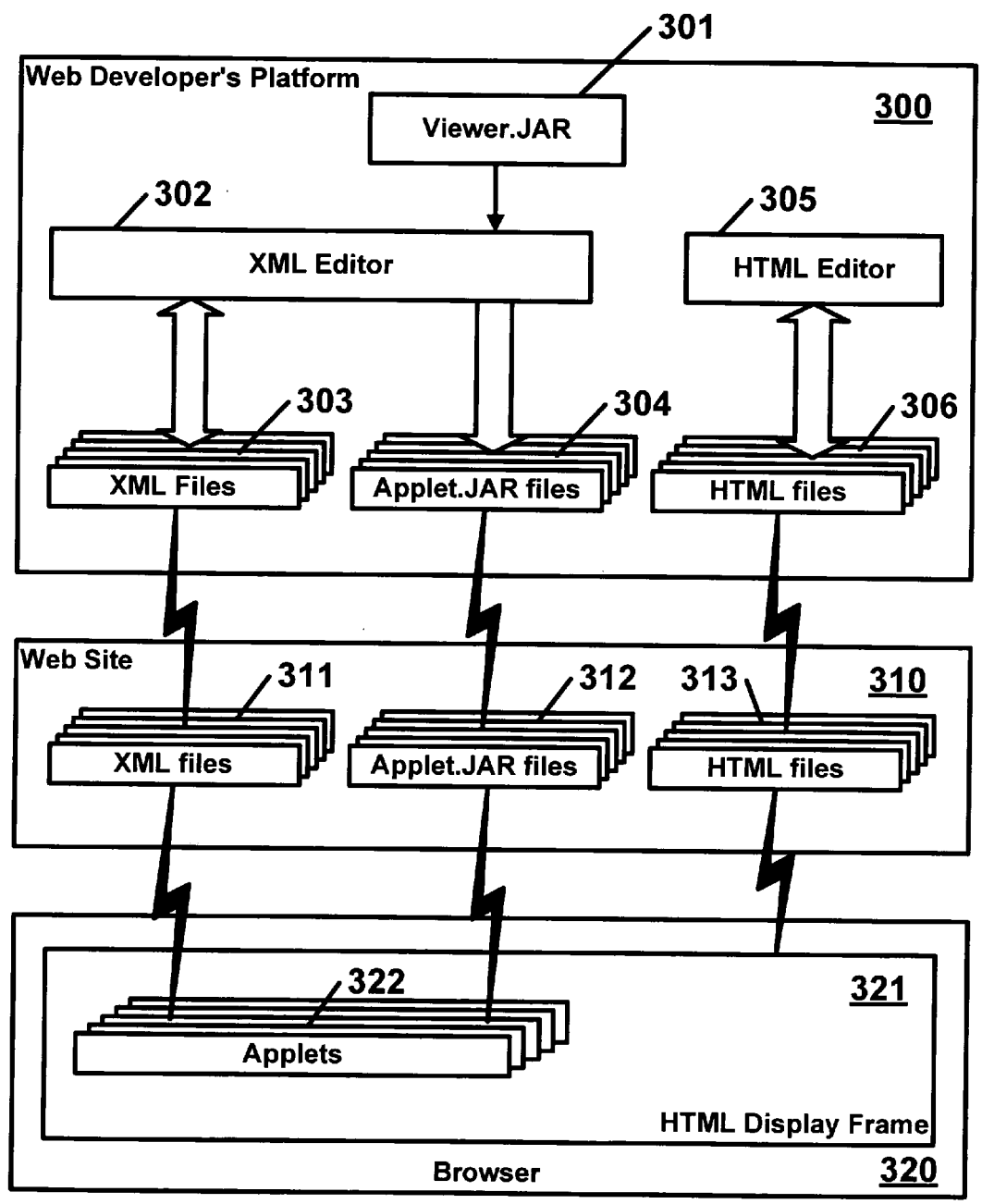
FIG. 3 is a block diagram showing the relationships between a web site developer's platform, a web site and a browser.

FIG. 3 is a block diagram that illustrates the relationships between a web site developer's platform 300, a web site 310 and browser 320 as per an embodiment of the present invention. The diagram represents an XML specific implementation of the present invention (as per FIG. 1). The web developer's platform 300 includes a viewer .JAR file 301 which may include a collection of viewer executable files. The viewer .JAR file 301 is preferably input to an XML editor 302 (an XML specific version of 104), which may edit XML files 303 and outputs applet .JAR files 304. The web developer's platform 300 may also include an HTML editor 305 which may edit HTML files 306 intended for use on a web site 310. The web site 310 is preferably housed on a web server and includes XML files 311, applet .JAR files 312, and HTML files 313 which may be read and displayed by a browser 320. The HTML files 313 define the HTML frame 321 which may contain applets 322. The applets 322 may be contained in the applet .JAR files 312 and use data contained in the XML files 311 and the applet .JAR files 312. The applets may also be JAVA beans.

Figure 4:
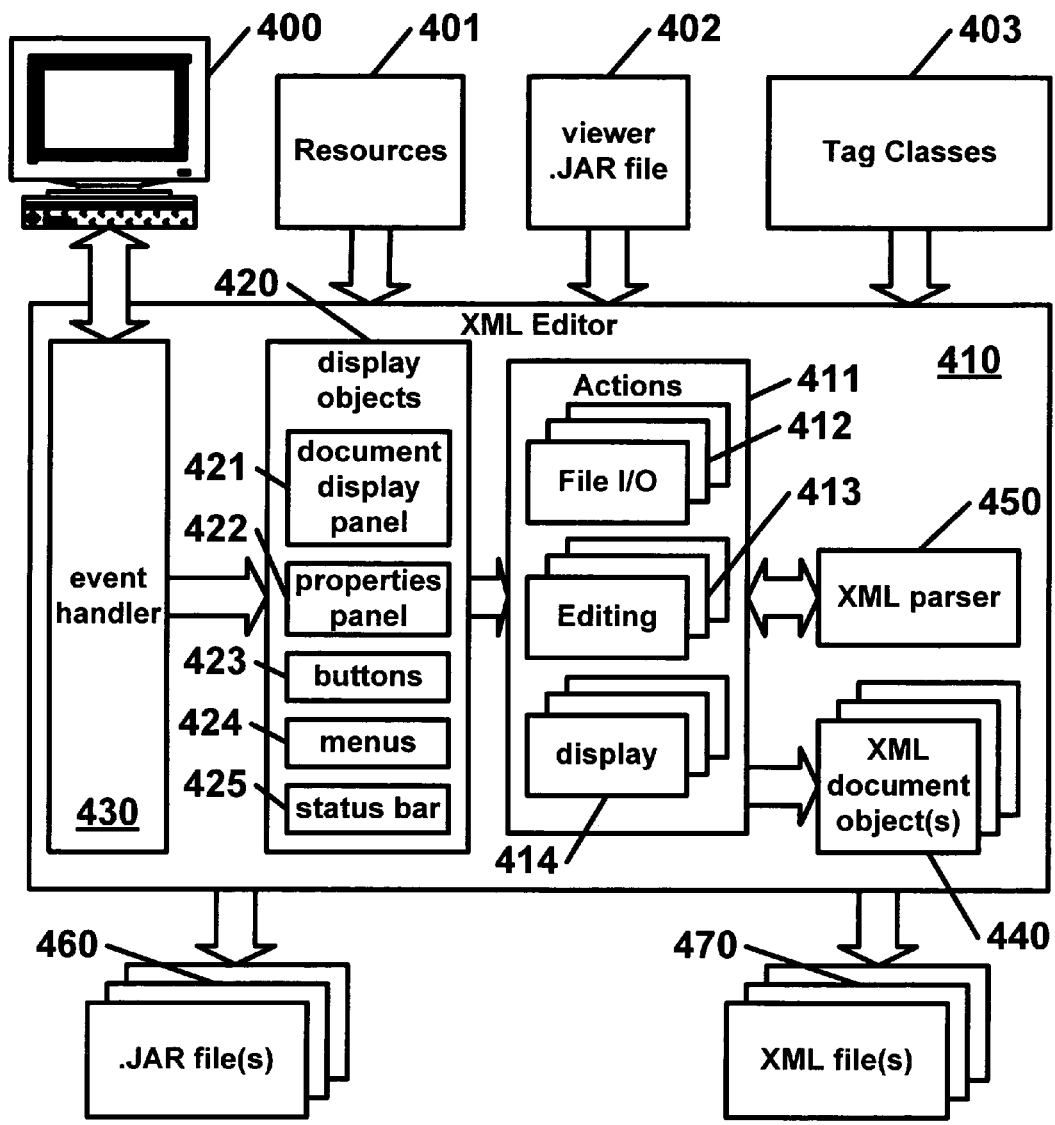
FIG. 4 is a block diagram of a Live Component editor utilizing XML.

FIG. 4 is a block diagram of a XML editor as per an aspect of an embodiment of the present invention. The XML editor 410 preferably accepts input from: a user 400; resources 401; a viewer .JAR file 402; and tag classes 403. The XML editor 410 preferably processes the inputs and generates for output .JAR file(s) 460 and XML files(s) 470. A user 400 observes a display and utilizing a keyboard and mouse generates events that may be handled by an event handler 430. The event handler 430 preferably interprets the events to determine which display object 420 needs action. The display objects 420 may include a document display panel 421, a properties panel 422, buttons 423, menus 424, and status bars 425. When a display object is modified an action may be generated. Actions 411 may include file I/O actions 412, editing actions 413, and display actions 414. Some actions may require parsing XML from resources 401 by XML parser 450. Some actions may cause XML document objects 440 to be modified.

Figure 5:
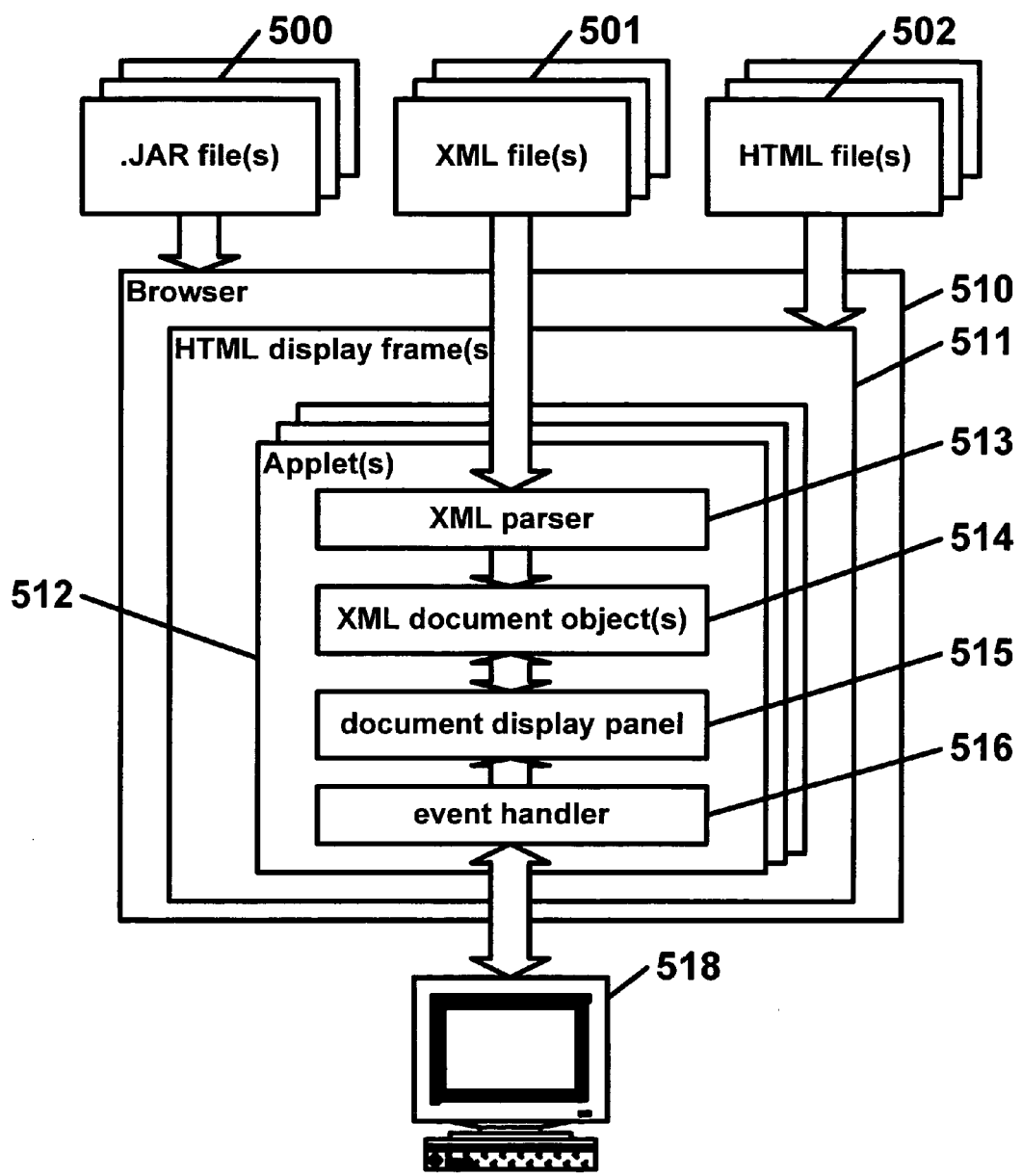
FIG. 5 is a block diagram illustrating live component viewer(s) usage in a browser.

FIG. 5 is a block diagram illustrating live component viewer(s) usage in a browser. Jar file(s) 500, XML file(s) 501 and HTML file(s) 502 may contain the content required to generate a live web page on the browser 510. The browser 510 generates an HTML display frame 511 that may contain the live components as described by the files 500, 501, and 502. The live components may be applet(s) 512. Each applet may contain an XML parser 513 which preferably parses the XML files(s) 501 into XML document objects 514 when the applet 512 is initialized. The XML document object may be an internal representation of an XML object(s). A document display panel 515 displays the XML document object(s) 514 to a user 518 based on instructions coming from the event handler 516. The event handler generates the instructions from events that are input from a user 518. Events may include mouse input, and keyboard inputs such as value changes.

Figure 6:
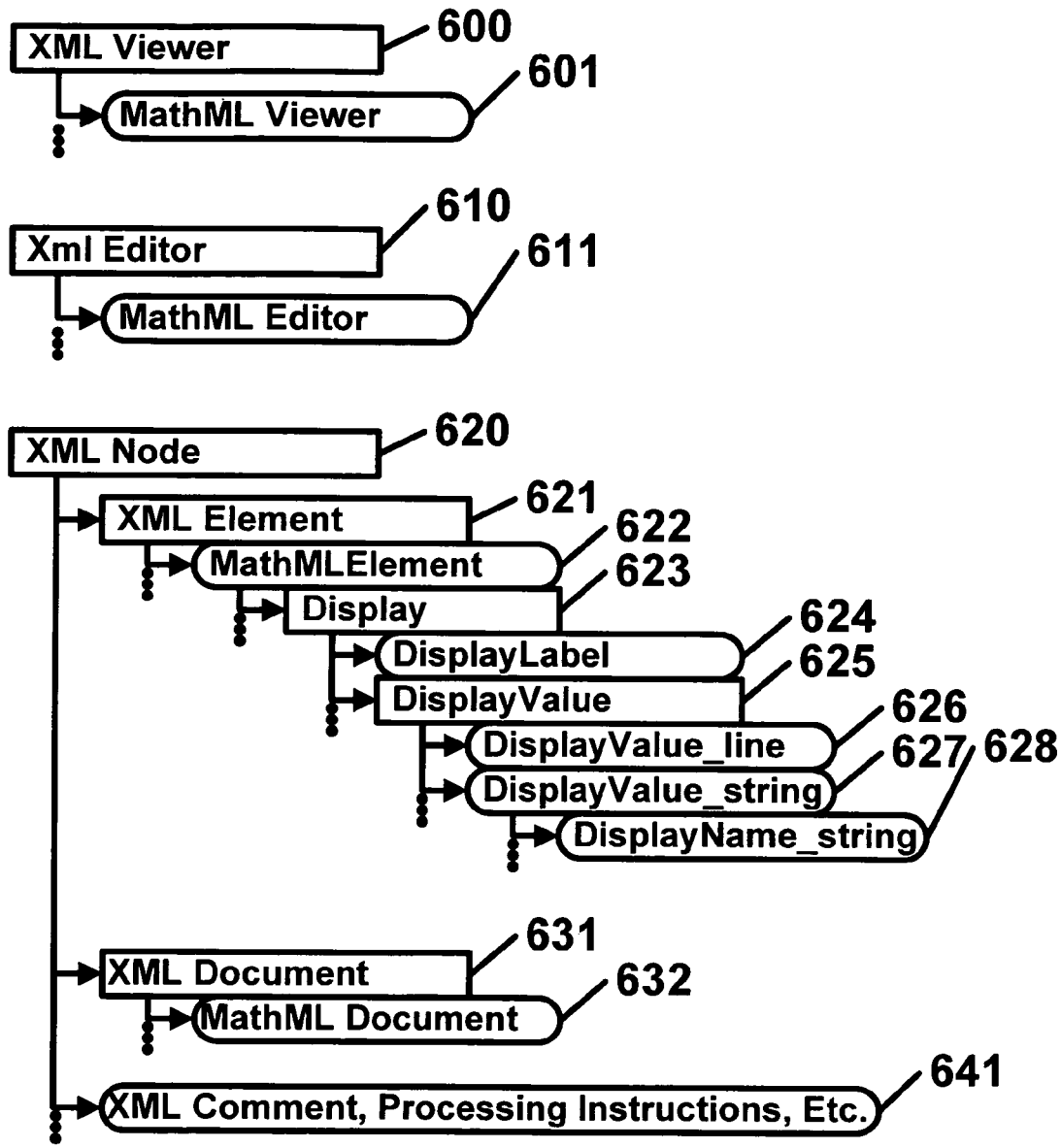
FIG. 6 is a block diagram of an MathML element subclass hierarchy.

FIG. 6 is a block diagram of a MathML element subclass hierarchy as per an aspect of the current invention implemented in JAVA. MathML is a specific example of an XML type that may be implemented by the present invention, and JAVA is an example of a specific language that may be used to implement the present invention. One skilled in the art will be able to see that different programming languages other than JAVA and different description languages including other types of XML may also be used. This hierarchy at its highest levels contains JAVA classes representing XML related modules. For example the highest level modules include an XML viewer 600, and XML editor 610 and an XML Node 620.

The XML viewer 600 class contains the code to implement a generic XML viewer. Subclasses of the XML viewer 600 may add code to implement additional functionality. For example, a MathML viewer 601 may implement additional functionality for a MathML specific viewer. The XML editor 610 class contains the code to implement a generic XML editor. Subclasses of the XML editor 610 may add code to implement additional functionality. For example, a MathML editor 611 may implement additional functionality for a MathML specific editor.

The XML node 620 class contains the code to implement a generic XML node. An XML node may be any point on an XML hierarchy as is known by those skilled in the art familiar with XML and other related concepts. Subclasses of the XML node 620 may include code to implement additional functionality. For example, additional functionality may be added to the XML element 621, XML document 631, and XML comment 641 classes. The XML element 621 may be further subclassed adding more additional functionality with each level in the hierarchy as shown in elements 622, 623, 624, 625, 626, 627, and 628. In the presently illustrated example, a MathML element 622 is subclassed into a display class 623 which is further subclassed to add more display specific functionality. Also illustrated is a MathML document 632 which is a subclass of XML document 631. Some examples of display functionality that may be added to display classes include new image displays based on value ranges such stop lights, meter gauges, and switch displays.

Figures 7A, 7B, 7C:
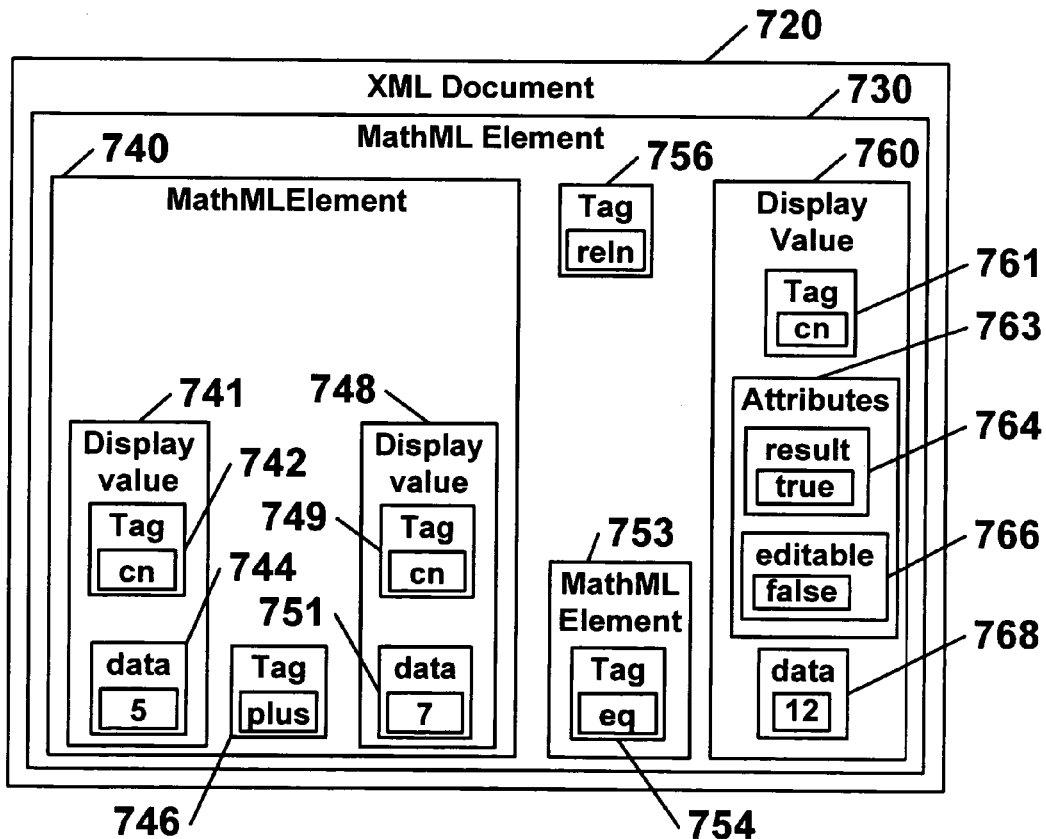
FIG. 7A shows an example equation.
FIG. 7B shows a MathML representation of a example equation.
FIG. 7C shows an internal representation of a example equation as per the present invention.

An example equation 700 that will be used to illustrate the internal structures that may be used by an aspect of the current invention is shown in FIG. 7A. As those skilled in the art will recognize, FIG. 7B shows a MathML representation 710 of the example equation 700. FIG. 7C shows an internal representation of the MathML 710 shown in FIG. 7B as per the present invention. An XML document 720 includes a MathML element 730 that further includes other objects that together represent the equation 700. The objects include a MathML elements 740 and 753, a Tag 756, and a display value 760.

XML tags are command elements that may be one of three types: a start tag, an end tag, or an empty element tag. Start and end tags come in pairs and may contain child elements between them. An empty element tag contains no children.

Tag 756 is a string object that contains the MathML tag string "rein", which indicates that the MathML element 730 represents the MathML relation operation. The MathML element 753 further contains the tag "eq" which indicates that the specific type of relation operation is an equals operation.

The display value 760 may include a tag object 761, an attributes object 764 and a data object 768. The tag 761 contains a "cn" string which indicates that it implements a MathML numeric constant display function. The data field 768 contains the result of the equals operation. The attribute object 763 may contain attributes which further specify the operation the display value 760. The current example contains a result attribute 764 set to "true" which sets the display value 760 as the result side of the equals operation, and an editable attribute 766 set to "false" which sets the display value 760 to not accept changes by the user.

The MathML element 740 may be the source of the equals operation contained in the MathMLElement 730 and contains a Tag 746 and two display values 741 and 748. The Tag 746 indicates that the MathMLElement should perform an addition operation on the two display values 741 and 748. The display values 741 and 748 each include tags 742 and 749 indicating that they implement the MathML "cn" function, and further include data fields 744 and 751 containing the values "5" and "7" which may be added by the addition operation contained in the MathMLElement 704 (further detailed by Operation plus 1026). The result of the addition operation may then be stored in the result display value 760.

MathML and most XML markup languages do not currently support live interactivity. One aspect of this invention that differs from MathML is that MathML extensions may be incorporated to add "live" functionality. In MathML, the "eq" tag would instruct a viewer to display an "=" sign. The current invention adds live functionality. The "=" sign may have several functions: assignment from left to right; an assignment from right to left; bi-directional assignment; and no assignment. In addition, the "=" sign may return a result from the equals operation. Such a result may, in the case of an assignment, return the most recently assigned value; or, in the case of no assignment, may return a boolean value indicating if the two operands are equal or not. The result may also be returned to higher levels of the hierarchy. Also, the result and editable attributes may be extensions to standard MathML to support live functionality.

FIG. 8A shows an example equation 800 containing a variable. This equation is similar to the equation 700, except that the 7 is replaced by a variable X1. FIG. 8B shows a MathML representation 810 of the example equation 800. The main difference between FIG. 7B and FIG. 8B is that the "<cn>7</cn>" line is replaced with a "ci" element and its children which is a MathML description of the X1 variable.

FIG. 8C shows an internal representation of the MathML 810 shown in FIG. 8B as per the present invention. The main difference between FIG. 7C and FIG. 8C is that the display value 748 is replaced by display name 830. Display name 830 contains a "ci" tag 832 and a MathML element 833. A "ci" tag is a MathML representation for a variable. The MathML element 833 contains a "msub" tag 839 and two display values 834 and 841. The display values 834 and 841 each include "mi" tags 835 and 842 indicating that data values 837 and 844 are MathML presentation items. The "msub" tag is the MathML representation for a subscript, so that data object 844 will display as a subscript to data object 837.

Figure 9A:
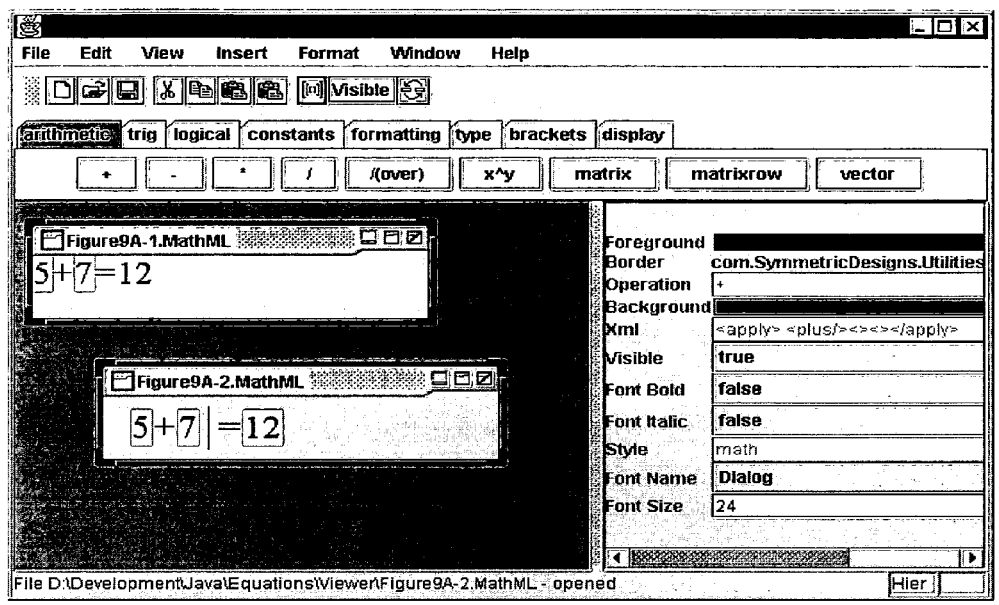
FIG. 9A shows a screen shot of an example equation.

FIG. 9A shows a screen shot of an example equation being generated.

Figure 9B:
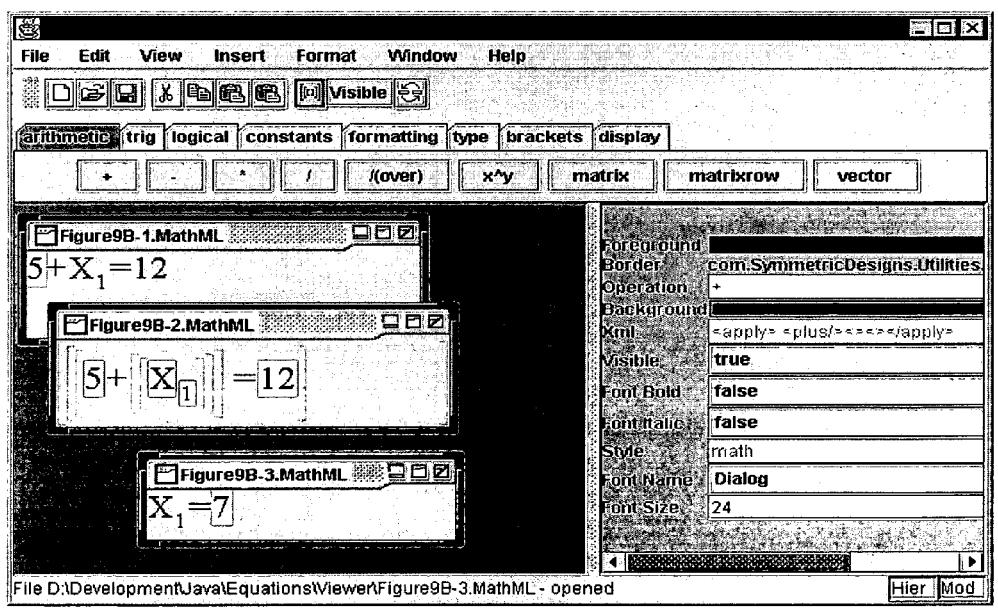
FIG. 9B shows a screen shot of an example equation containing a variable.

FIG. 9B shows a screen shot of an example equation containing a variable being generated.

Figure 10:
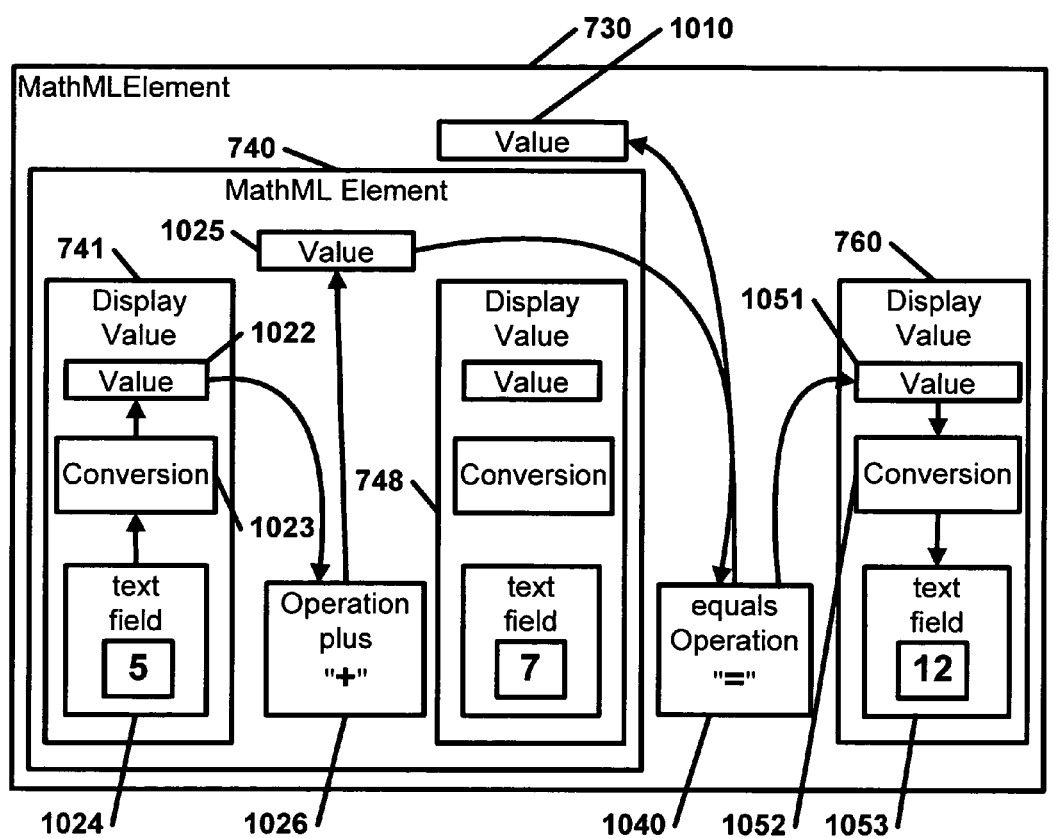
FIG. 10 is a block diagram showing the propagation of an event through a live MathML component document object hierarchy.

FIG. 10 is a block diagram showing the propagation of an event through a live MathML component document object hierarchy. Example equation 700 from FIGS. 7A, 7B, and 7C are illustrated. One purpose of event propagation may be to recalculate an equation when an element of an equation changes. In the presently illustrated example, the data in text field 1024 is modified to a value of "5". The value "5" is converted by a conversion object 1023 from a displayed representation to an internal representation that may be operated on and stored in value object 1022. Any value object that has changed may notify other objects that may be listening of the change. In this example, value object 1022 notifies MathML element 740 that it has changed and MathML element 740 notifies plus operation object 1026 to recalculate and store its result in value 1025. Now that value object 1025 has changed, it notifies its listener MathML element 730 that it has changed. MathML element 730 then notifies equals operation object 1040 to recalculate and store its logical result in value object 1010. Because the result 764 (FIG. 7C) was set to true, the numerical result is stored in value object 1051. The conversion object 1052 then converts the value stored in value object 1051 from an internal representation to a display representation and stores that result in text field 1053.

Figure 11:
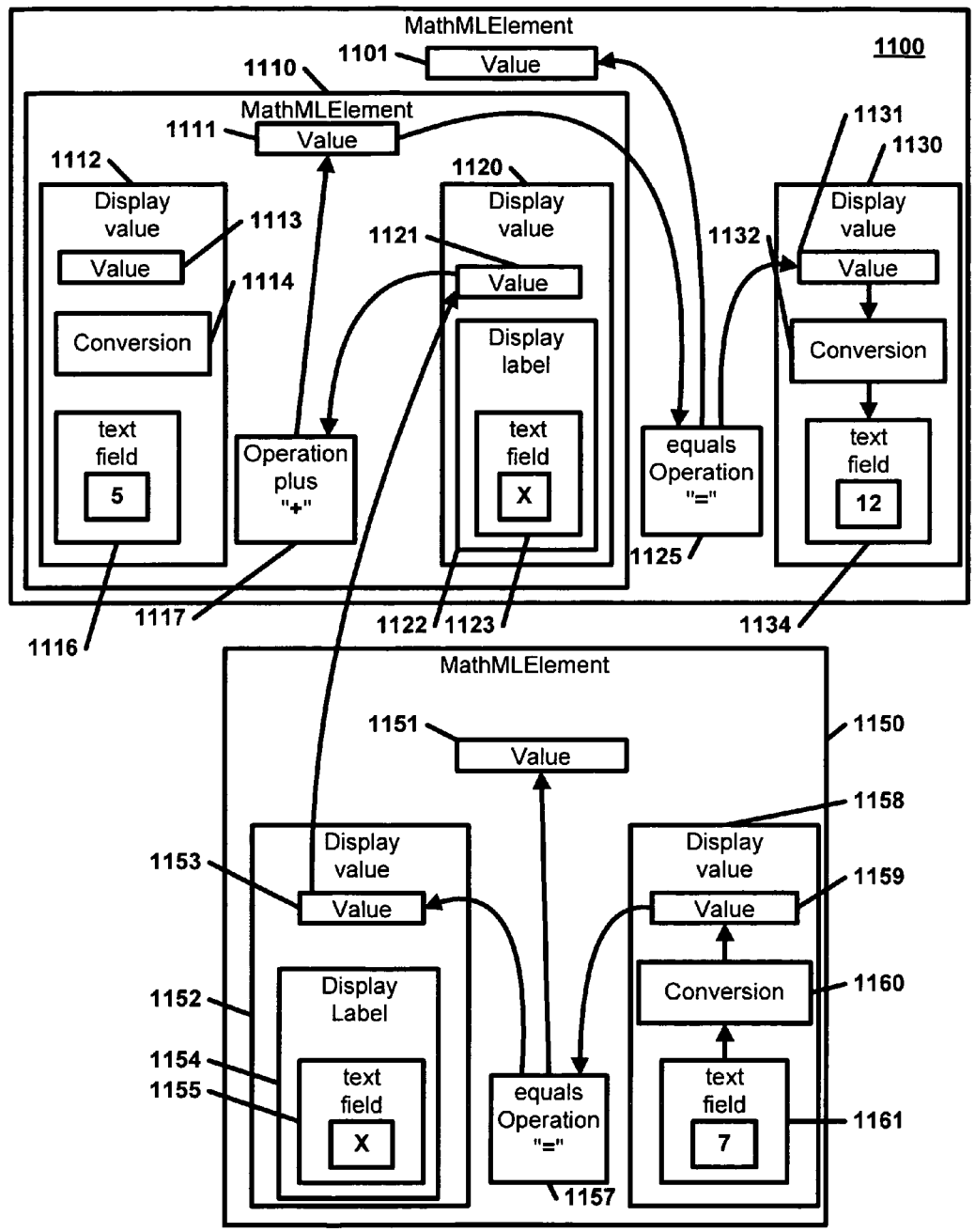
FIG. 11 is a block diagram showing the propagation of an event through a live MathML component document object hierarchy that contains a variable linking two equations together.

FIG. 11 is a block diagram showing the propagation of an event through a live MathML component document object hierarchy that contains a variable linking two equations together. A MathML element 1100 represents the equation "5+X=12" and a MathML element 1150 represents the equation "X=7". The two equations are linked by the variable "X", and the MathML elements are linked internally by the two values 1153 and 1121. When an element of an equation changes, the equation is recalculated by an event which propagates through the equation hierarchy. In the presently illustrated example, the data in text field 1161 is modified to a value of "7". The value "7" is converted by a conversion object 1160 from a displayed representation to an internal representation in value object 1159. Now that value object 1159 has changed it notifies its listeners (MathML element 1150) that it has changed. MathML element 1150 then notifies equals operation object 1157 to recalculate and store its logical result in value object 1151. In the present example, display value 1152 contains a result attribute set to true (not shown), the numerical result is stored in value object 1153. Now that value object 1153 has changed it notifies its listeners (value object 1121) that it has changed. Value object 1121 in turn notifies its listeners (MathML element 1110) of the change. MathML element 1110 then notifies plus operation 1117 to recalculate and store its numerical result in value object 1111. Now that value object 1111 has changed it notifies its listeners (MathML element 1100) that it has changed. MathML element 1100 then notifies equals operation 1125 to recalculate and store its logical result in value object 1101. In the present example, the display value 1130 contains a result attribute set to true (not shown), the numerical result is stored in value object 1131. The conversion object 1132 then converts the value stored in value object 1131 from an internal representation to a display representation and stores that result in text field 1134.

Figure 12:
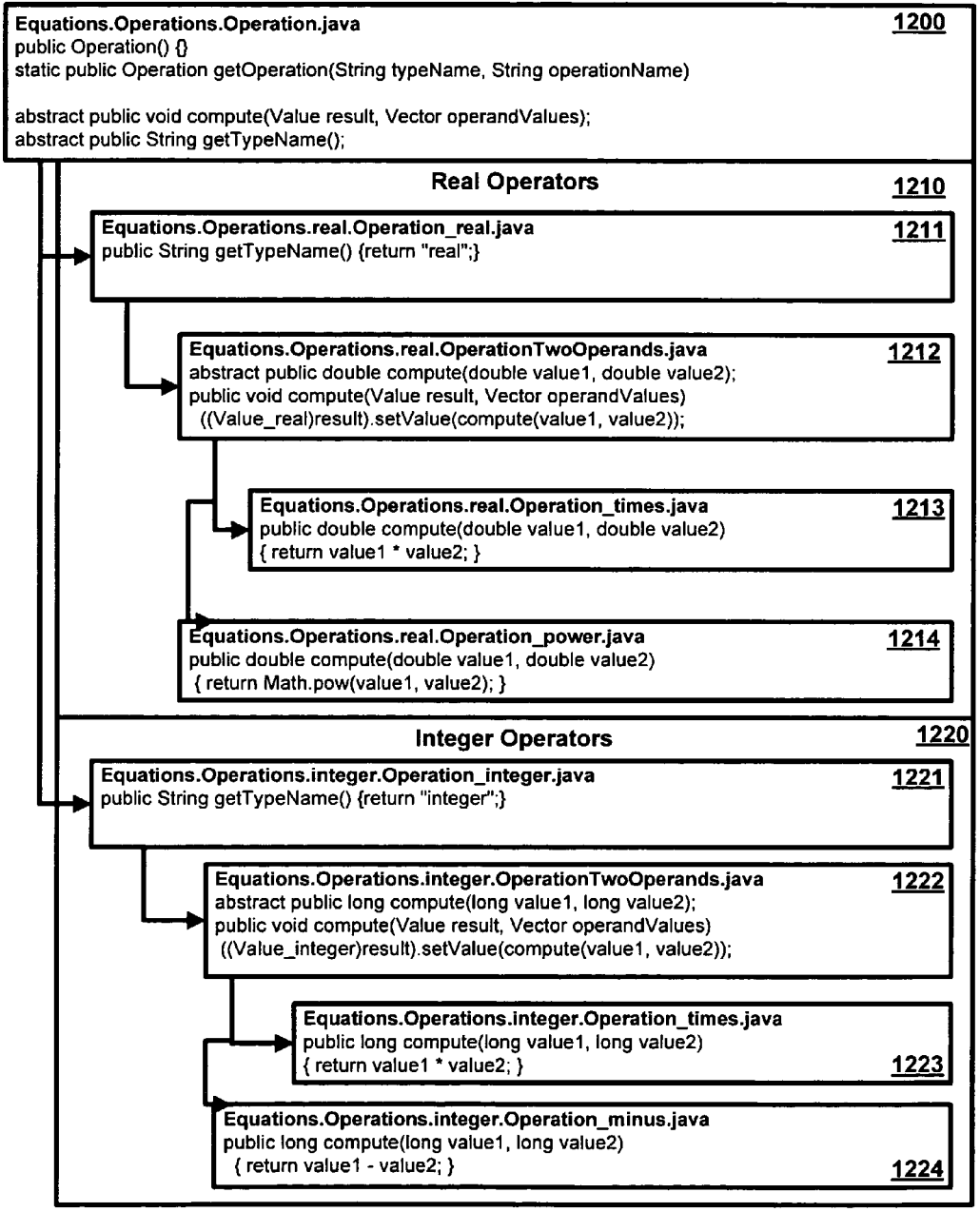
FIG. 12 is a diagram showing a portion of the operation subclass hierarchy as per an aspect of the current invention implemented in JAVA.

FIG. 12 is a diagram showing a portion of the operation subclass hierarchy as per an aspect of the current invention implemented in JAVA. The top level Operation class 1200 contains Java methods common to all operations, and methods which must be included in operation subclasses (abstract methods). The common methods may include class instance constructors and methods to return operations given the operation name and type. A method to return operations (getOperation( )) may create new operations or return cached operations. The abstract methods may include a method to compute an operation (compute( )) and a method to return the type of operation (getTypeName( )). The method to compute the result of the operation may contain two arguments, a vector object of operand values to perform the operation on and a result value to store the result of the operation in.

The abstract methods may be implemented by subclasses of the operation class 1200 which may be categorized by the type of value the specific operation returns. Two categories of subclasses are shown, a real operators category 1210 and an integer operators category 1220, each containing a subclass of the operation class 1200. The Operation_real 1211 subclass implements those operations which return real values, represented internally in the present invention by the Java data type "double". The Operation_real subclass implements the getTypeName( ) method which returns the string "real". The Operation_integer 1221 subclass implements those operations which return integer values, represented internally in the present invention by the Java data type "long". The Operation_integer subclass implements the getTypeName( ) method which returns the string "long".

The Operation_real subclass 1211 is further subclassed by a OperationTwoOperands subclass 1212 which implements the compute( ) method required by the operation class 1200 and contains a new abstract compute( ) method which takes two double arguments and returns a double result. The new compute( ) method is called by the compute( ) method implemented by the OperationTwoOperands subclass 1212. The new compute method may be implemented by subclasses of OperationTwoOperands 1212.

The OperationTwoOperands subclass 1212 is further subclassed by a Operation_times subclass 1213 and a Operations_power subclass 1214. The Operation_times subclass 1213 implements the compute( ) method required by the OperationTwoOperands subclass 1212 and calculates the product of the two double arguments and returns the double result. The Operation_power subclass 1214 implements the compute( ) method required by the OperationTwoOperands subclass 1212 and returns the double result of raising the double value1 to the power of double value2.

The Operation_integer subclass 1221 is further subclassed by a OperationTwoOperands 1222 subclass which implements the compute( ) method required by the operation class 1200 and contains a new abstract compute( ) method which takes two integer arguments and returns an integer result. The new compute( ) method is called by the compute( ) method implemented by the OperationTwoOperands subclass 1222. The new compute method may be implemented by subclasses of OperationTwoOperands 1222.

The OperationTwoOperands subclass 1222 is further subclassed by a Operation_times subclass 1223 and a Operations_minus subclass 1224. The Operation_times subclass 1223 implements the compute( ) method required by the OperationTwoOperands subclass 1222 and calculates the product of the two integer arguments and returns the integer result. The Operation_minus subclass 1224 implements the compute( ) method required by the OperationTwoOperands subclass 1222 and returns the integer result of subtracting the integer value2 from the integer value1.

Other operations specific to different areas of interest such as other specialized XML types may be implemented in this hierarchy and may include: real time operations such as timers; math operations such as trigonometric functions; input and output functions such as get, put, mail and fax; algorithmic functions such as loops; and time and date functions such as days until.

FIG. 13 is a diagram showing a portion of the conversion subclass hierarchy as per an aspect of the current invention implemented in JAVA. The top level Conversion class 1300 contains Java methods common to all conversions, and methods which must be included in conversion subclasses (abstract methods). The common methods may include a method to return conversions given the conversion name, type and format. The method to return conversion may create new conversions or return cached conversions.

One subclass of the conversion class 1300 is shown. The Conversion_string subclass 1310 may contain a method to get a new Conversion_string instance given a type and a display format name, and abstract methods to convert a String to a Value (toValue( )) and to convert a Value to a String (fromValue( )).

Conversion_string 1310 is further subclassed by Conversion_double 1320 which implements the abstract methods of Conversion_string 1310 and defines the abstract method toValue( ) and fromValue( ) which operate on Java double values instead of Value objects. The toValue( ) and fromValue( ) methods implemented by Conversion_string 1310 in turn call the new abstract toValue( ) and fromValue( ) methods which may be implemented by subclasses of Conversion_double 1320.

Conversion_double 1320 is further subclassed by Conversion_Binary 1330 which implements the abstract methods of Conversion_double 1320 and defines the abstract method toValue( ) and fromValue( ) which convert Java double values to and from Java Strings. The Strings contain a String representation of the binary value of the Java double value.

Conversion_double 1320 is further subclassed by Conversion_FloatingPoint 1340 which implements the abstract methods of Conversion_double 1320 and defines the abstract method toValue( ) and fromValue( ) which convert Java double values to and from Java Strings. The Strings contain a floating point representation of the Java double value.

Figure 14:
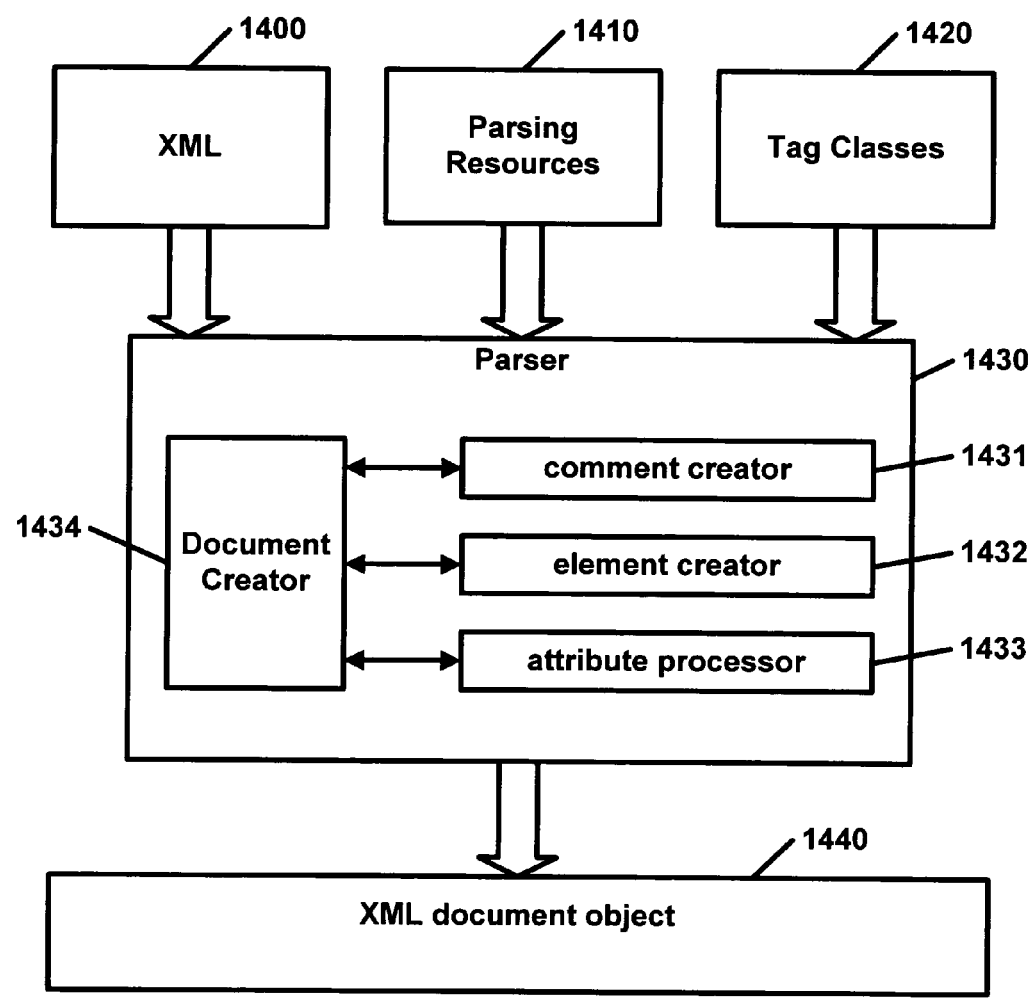
FIG. 14 is a block diagram of an XML parser.

FIG. 14 is a block diagram of an XML parser. This parser may be part of the development environment and part of the live component that may run on a client. An important aspect of the parser allows the live component to preferably be scaled to a minimum size. Only those parts of the parser that are needed on the client side are included, determined by the specific XML tags used by the live components. The input to the parser 1430 may include the XML 1400 to be parsed, parsing resources 1410, and tag classes 1420. The parsing resources may include translations from XML tags to the name of the tag classes 1420 needed to load an XML node. The parser 1430 contains a document creator 1434 which parses each node of the XML and creates an XML document 1440. The document creator 1434 calls a comment creator 1431, an element creator 1432, and an attribute processor 1433 as needed for each node in the parsed XML. The comment creator 1431 creates an XML node which holds an XML comment. This preserves comments from the XML structure so that the XML may be recreated later. The element creator 1432 recognizes XML elements in the XML 1400 and converts them into XML element objects which are then included in the XML document object 1440. The attribute processor 1433 recognizes attributes in XML 1400 and converts them into XML node attributes which are then included in the XML elements of the XML document object 1440.

Figure 15:
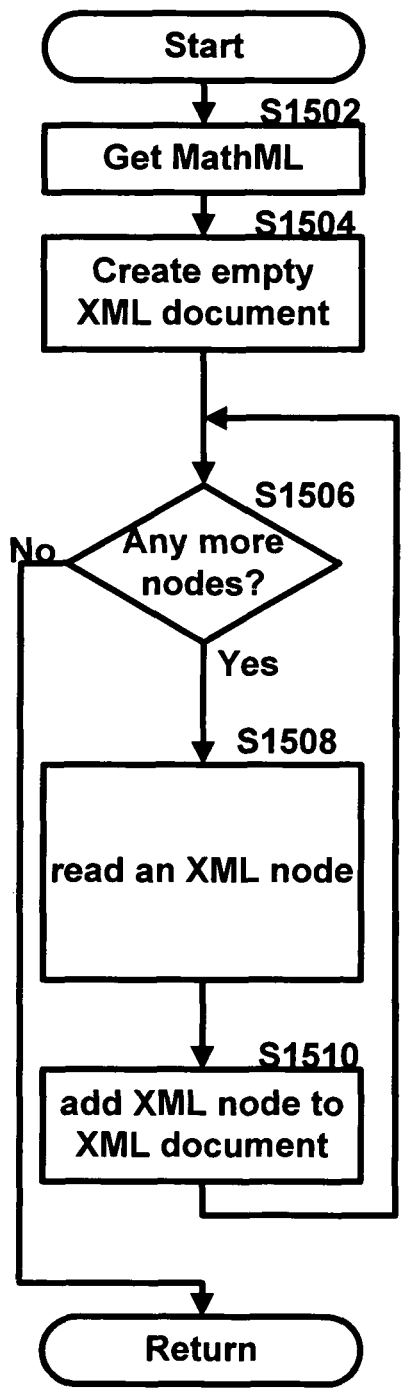
FIG. 15 is a flow diagram of an XML parser creating an XML document.

FIG. 15 is a flow diagram of an XML parser creating an XML document. The XML parser is a basic aspect of the present invention that allows the XML to be parsed into its basic elements and converted into an internal representation of the live component. Step S1502 may get an XML string such as MathML and prepares it to be parsed. Step S1504 creates an empty XML document object that may be used to store parsed XML. Next, a decision loop starts with step S1506 which determines if any nodes in the XML need to be parsed. If false the algorithm ends. If there are XML nodes that need to be parsed, then the next XML node is read at step S1508 and then added to the XML document object at step S1510. Finally the loop returns back to step S1506 where a determination is made again if any more nodes need parsing.

Figure 16:
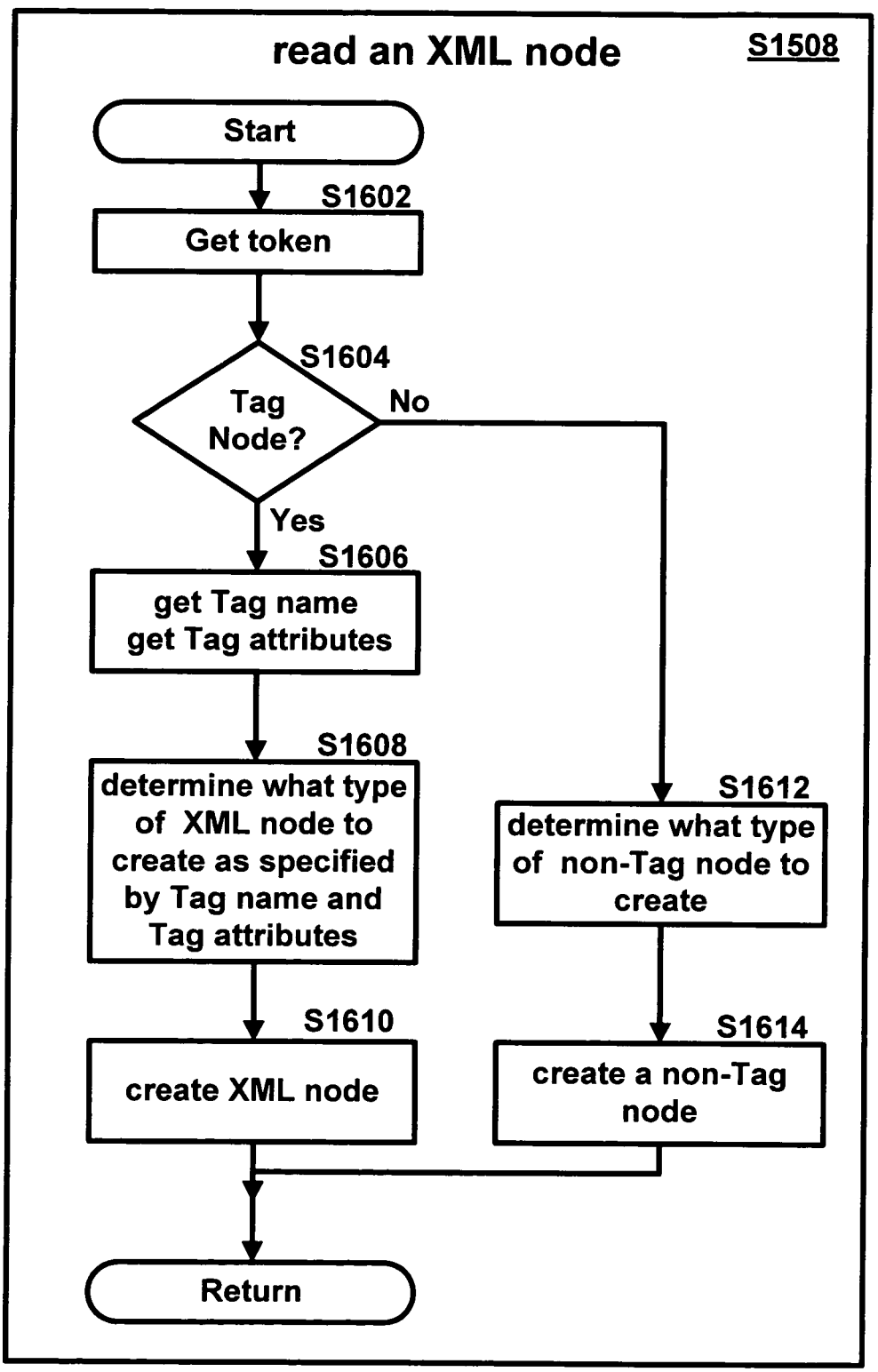
FIG. 16 is a flow diagram of an XML parser reading an XML node.

The flow diagram in FIG. 16 is an expansion of step S1508 showing how an XML parser may read an XML node. Step S1602 gets a token from the prepared XML obtained in step S1502. Next, step S1604 decides if the token is a tag. A non-tag may start with either "<!" (comment) or "<?" (processing instruction). If the token was determined to be a non-tag node at step S1604, then step S1612 determines what type of non tag node to create. Then step S1614 creates the non-tag node as determined in step S1612. If the token is a tag node, then processing proceeds to step S1606 where the tag name and tag attributes are extracted from the XML. Step S1608 then determines from the extracted tag name and tag attributes what type of XML node to create. Step S1610 then creates the XML node as determined by step S1608. The created node is returned so that step S1510 may add the XML node to the XML document object.

Figure 17:
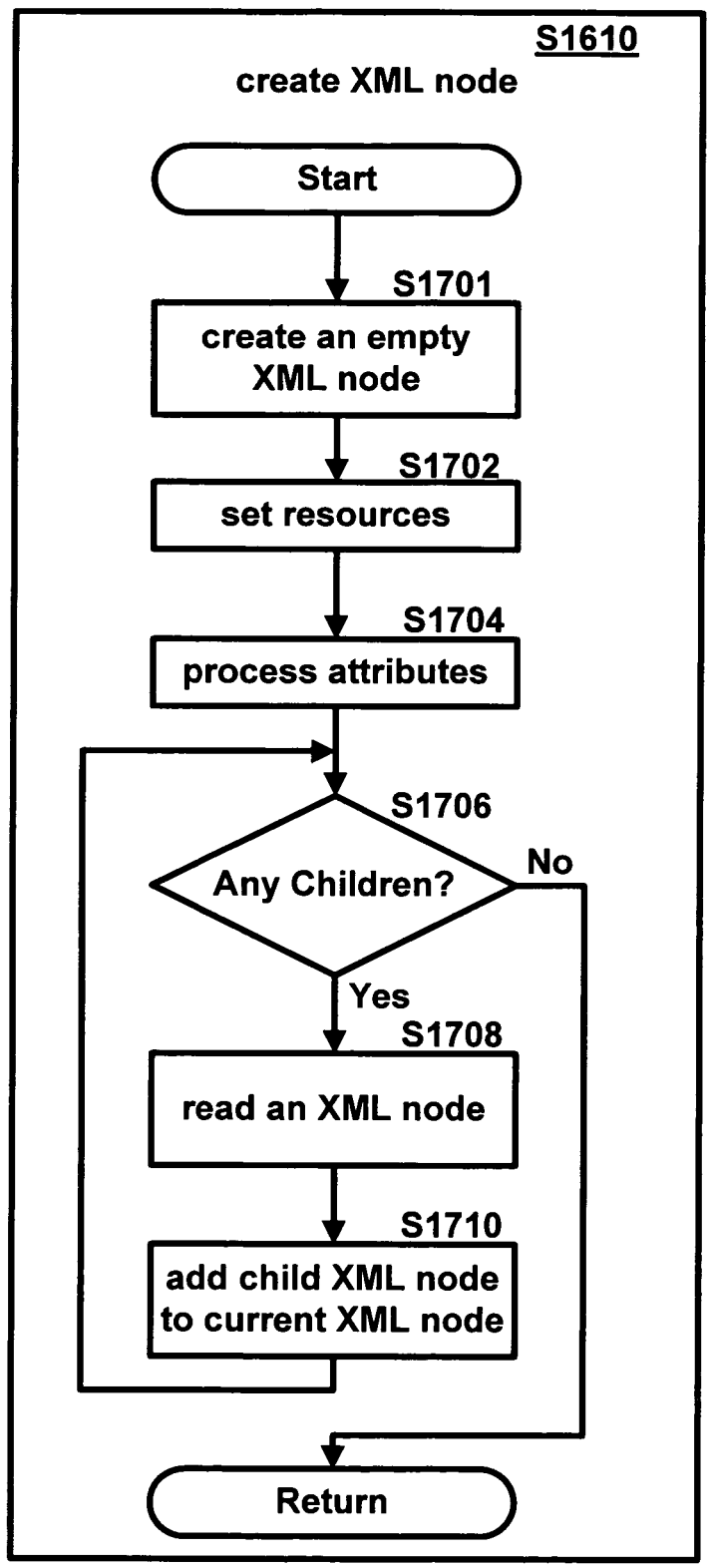
FIG. 17 is a flow diagram of an XML parser creating an XML node.

FIG. 17 is an expansion of step S1610 showing a flow diagram of how an XML parser may create an XML node. Step S1701 creates a new empty XML node. Step S1702 selects the new node's resources from the parsing resources 1410. The selected resources may be based on the type of node created (as per S1608). Step S1704 then processes the node's attributes and configures the XML node appropriately. Next, step S1706 decides if the current node contains any child nodes. If there are no child nodes the current node is returned so that S1510 may add the XML node to the XML document object. If there are child nodes step S1708 then reads the next XML node. Step S1708 may be a recursive call to step S1508 (FIG. 16). Next, step S1710 adds the newly read child XML node to the current XML node. Finally the loop returns back to step S1706 where a determination is made again if there are any more child nodes.

Figure 18:
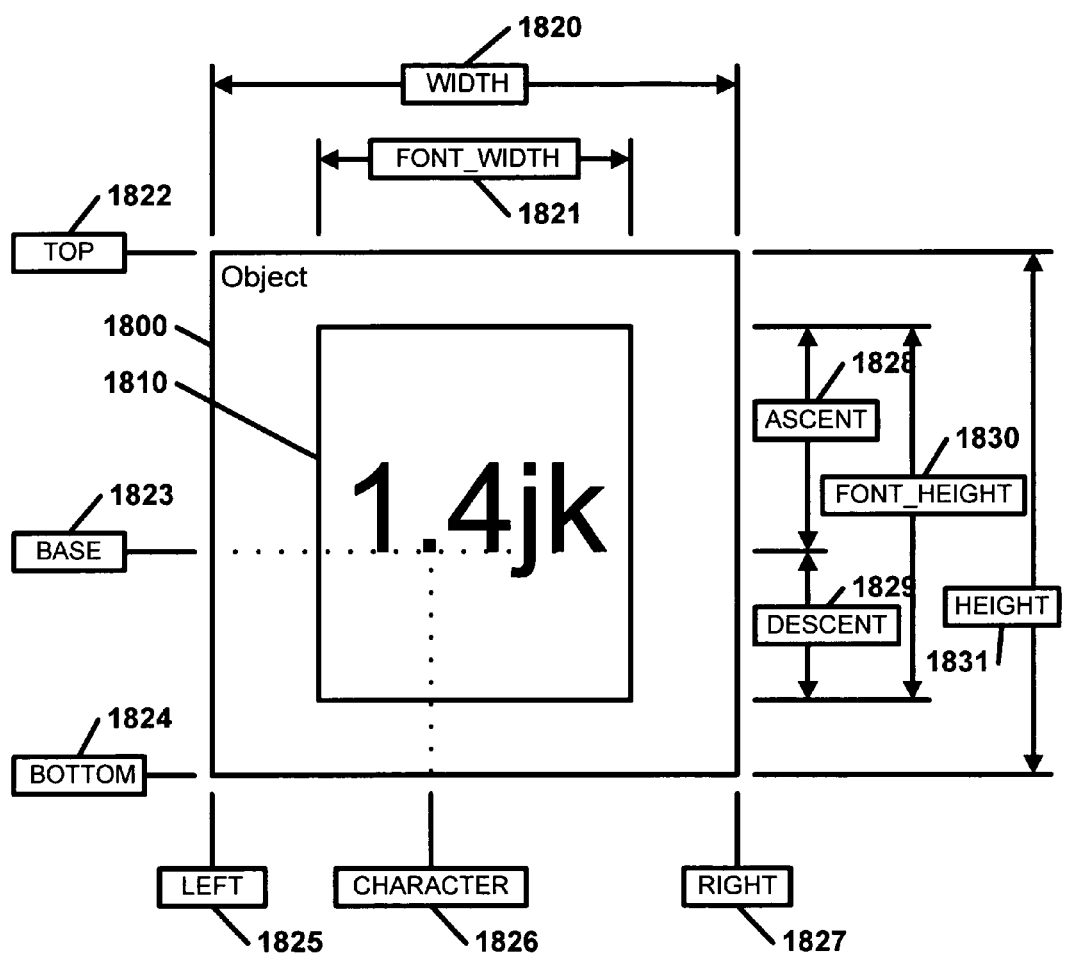
FIG. 18 is a diagram showing examples of layout object alignment positions and layout object measurement values.

Now we will discuss another important aspect of the present invention, the layout manager. The layout manager may freely position objects relative to other objects while many other layout managers layout objects explicitly based on a grid. Relative positioning allows for finer positioning without having to explicitly specify an object's position. FIG. 18 is a diagram showing examples of layout object alignment positions and layout object measurement values. A layout object 1800 may be positioned by the layout manager and may contain a displayed character string 1810, which is shown with layout object alignment positions and layout object measurement values. The alignment positions are places on the layout object 1800 that the layout manager may use to position components and may include the bottom 1824, top 1822, left 1825, or right 1827 edges of the layout object 1800; the base 1823 of the layout object; or the horizontal position of a particular character 1826 in the character string 1810. The base 1823 position may be the base from the character string 1810's font. The layout object measurement values are aspects of the layout object 1800 that the layout manager may measure to assist with the layout and may include the layout object 1800 width 1820, or height 1831, or the character string 1810's font width 1821, ascent 1828, descent 1829, or height 1830.

Figure 19A:
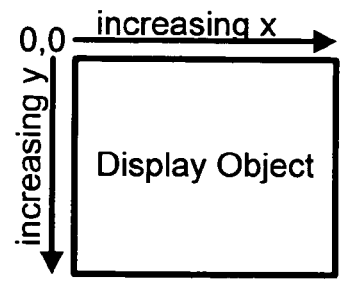
FIG. 19A shows an alignment coordinate system

FIG. 19A shows an alignment coordinate system which may be used by the layout manager to position objects.

Figure 19B:
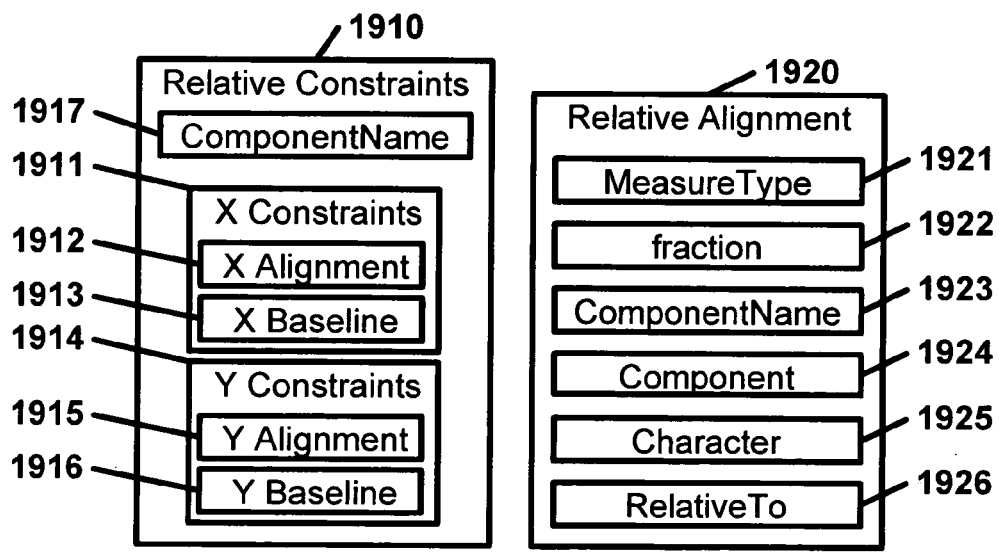
FIG. 19B shows relative constraints objects as per an aspect of the invention.

FIG. 19B shows relative constraints objects as per an aspect of the invention. Each layout object 1800 being laid out by the layout manager may have a relative constraints object 1910 associated with it which describes how the layout object 1800 should be positioned. The relative constraints objects 1910 may contain a component name 1917 which may contain the name of the layout object 1800; X constraints 1911 which may further contain X alignment 1912 constraints and X baseline 1913 constraints; and Y constraints 1914 which may further contain Y alignment 1915 constraints and Y Baseline 1916 constraints. The X alignment 1912, Y alignment 1915, X baseline 1914, and Y baseline 1916 constraints are all Relative alignment constraint objects 1920. The X alignment 1912 specifies a X position on another layout object, X baseline 1913 specifies a X position on the current layout object 1800, Y alignment 1915 specifies a Y position on another layout object, and Y baseline 1916 specifies a Y position on the current layout object 1800.

Each Relative Alignment 1920 constraint object may contain measure type 1921, fraction 1922, component name 1923, component 1924, character 1925, and relative to 1926 objects. Component name 1923 and component 1924 may specify another layout component and a name that the layout manager will align the layout component 1800 to. Measure type 1921 may specify a type of measurement (as described in FIG. 18 above) and a fraction 1922 that may specify a multiplier to scale the measurement made by the layout manager. The relative to object 1926 may specify an alignment position (also described in FIG. 18 above) that the layout manager may use as a reference point when the measurement is made. Character 1925 may specify a character in the character string whose X position may be used as an alignment point if the alignment type is character 1826.

Figure 20:
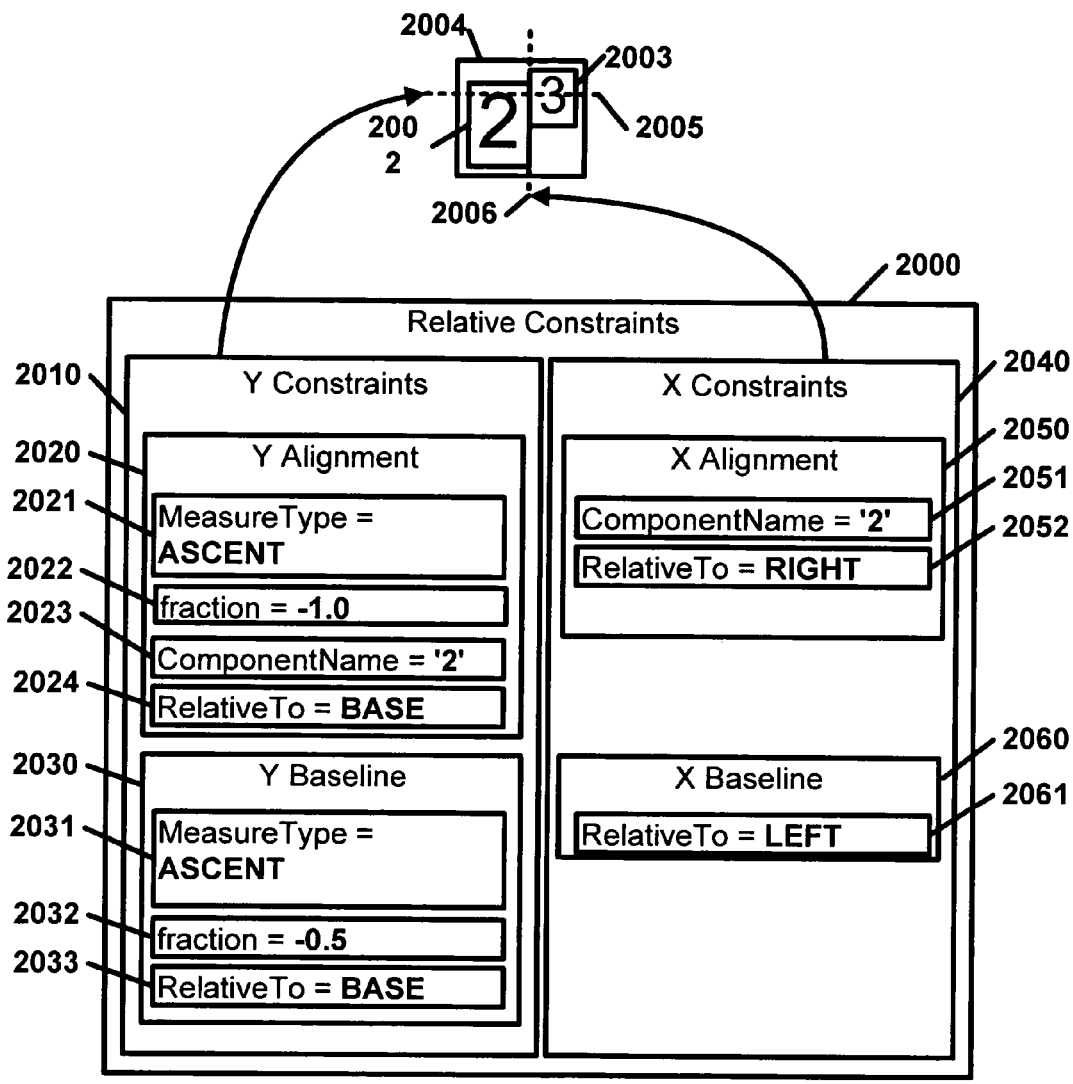
FIG. 20 shows an exemplary example of superscript alignment.

FIG. 20 shows an exemplary example of layout manager object alignment. A layout object 2004 contains layout objects 2002 and 2003. Layout object 2003 (containing a "3") is being positioned as a superscript of layout object 2002 (containing a "2"). Layout object 2002 may have been positioned previously or may not be positioned. The layout manager positions layout object 2003 relative to layout object 2002 using the relative constraint object 2000. The X baseline object 2060 contains a "Relative To" object 2061 which specifies the LEFT edge of the layout object 2003 as its X alignment position. The X alignment object 2050 contains a "Relative To" object 2052 and a component name 2051 which indicates that the RIGHT edge of the layout object named "2" (layout object 2002) should be used as the X alignment position. Layout object 2003 is positioned so that its X alignment position is aligned with layout object 2002's X alignment position. The Y baseline object 2030 contains a "Relative To" object 2033, a fraction 2032, and a "Measure Type" object 2031 which specifies layout object 2003's Y alignment position as the middle of its ASCENT measurement (BASE position +−0.5*ASCENT size). The Y alignment object 2020 contains a "Relative To" object 2024, a component name 2023, a fraction 2022, and a "Measure Type" object 2021 which specifies that the top of the ASCENT measurement (BASE position +−1.0*ASCENT size) of a layout object named "2" (layout object 2002) should be used as the Y alignment position. Layout object 2003 is positioned so that its Y alignment position is aligned with layout object 2002's Y alignment position.

Figure 21:
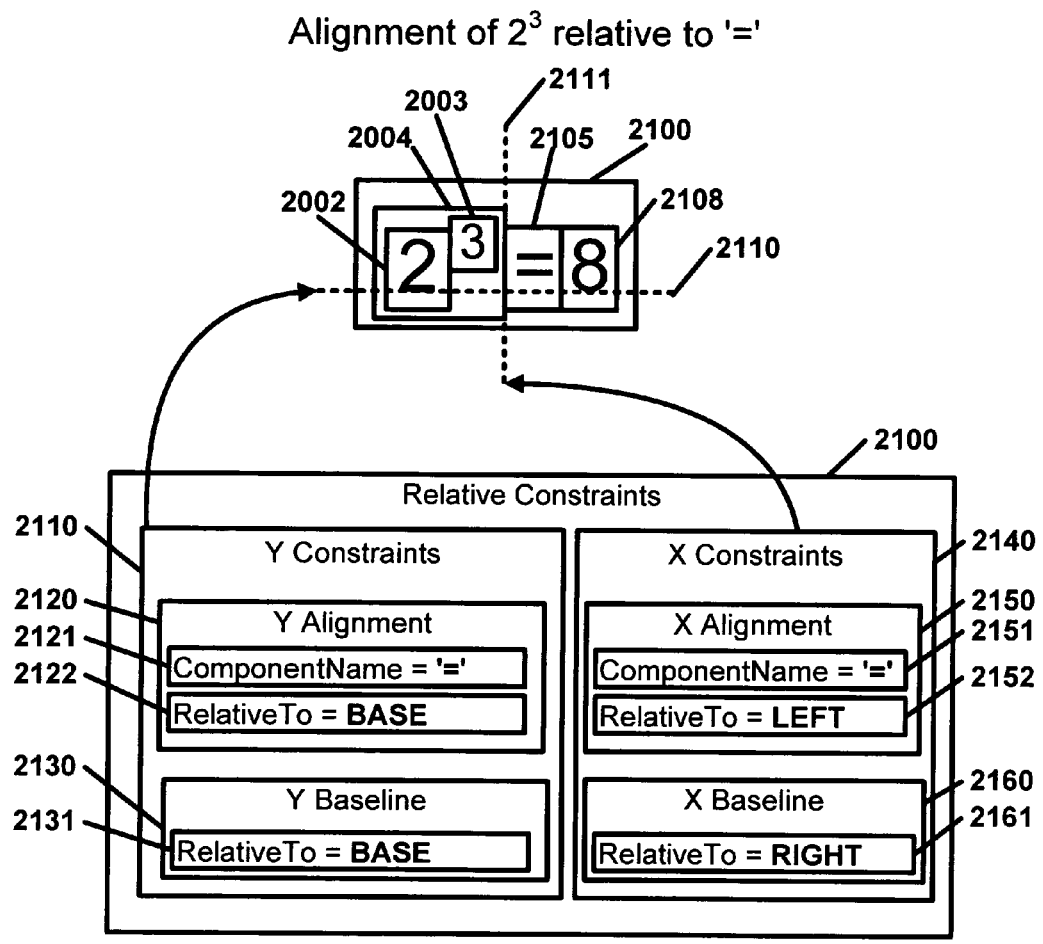
FIG. 21 shows an exemplary example of a nested relative layout manager.

FIG. 21 shows an exemplary example of a nested relative layout manager. A layout object 2100 contains layout objects 2004, 2105, and 2108. Layout object 2004 (the layout of which is described above in FIG. 20) is being positioned to the left of layout object 2105 (containing a "="). The layout of layout object 2108 is not described in this example. The layout manager positions layout object 2004 relative to layout object 2105 using the relative constraint object 2100.

The X baseline object 2160 contains a "Relative To" object 2161 which specifies the RIGHT edge of the layout object 2004 as its X alignment position. The X alignment object 2150 contains a "Relative To" object 2152 and a component name 2151 which indicates that the LEFT edge should be used as the X alignment position of the layout object named "=" (layout object 2105). Layout object 2004 is positioned so that its X alignment position is aligned with layout object 2105's X alignment position (the RIGHT of 2004 is aligned with the LEFT of 2105).

The Y baseline object 2130 contains a "Relative To" object 2131 which specifies layout object 2004's Y alignment position as its BASE position. A nested layout object may specify an additional relative constraints object (not shown) which may indicate another layout object within itself to make measurements from. In the present example the layout object 2004 contains an additional relative constraints object to indicate that its BASE position is the BASE position of layout object 2002. The Y alignment object 2120 contains a "Relative To" object 2122 and a component name 2121 which specifies that the BASE position should be used as the alignment position of a layout object named "=" (layout object 2105). Layout object 2004 is positioned so that its Y alignment position is aligned with layout object 2105's Y alignment position (the BASE of 2004 and 2002 are aligned with the BASE of 2105).

Figure 22:
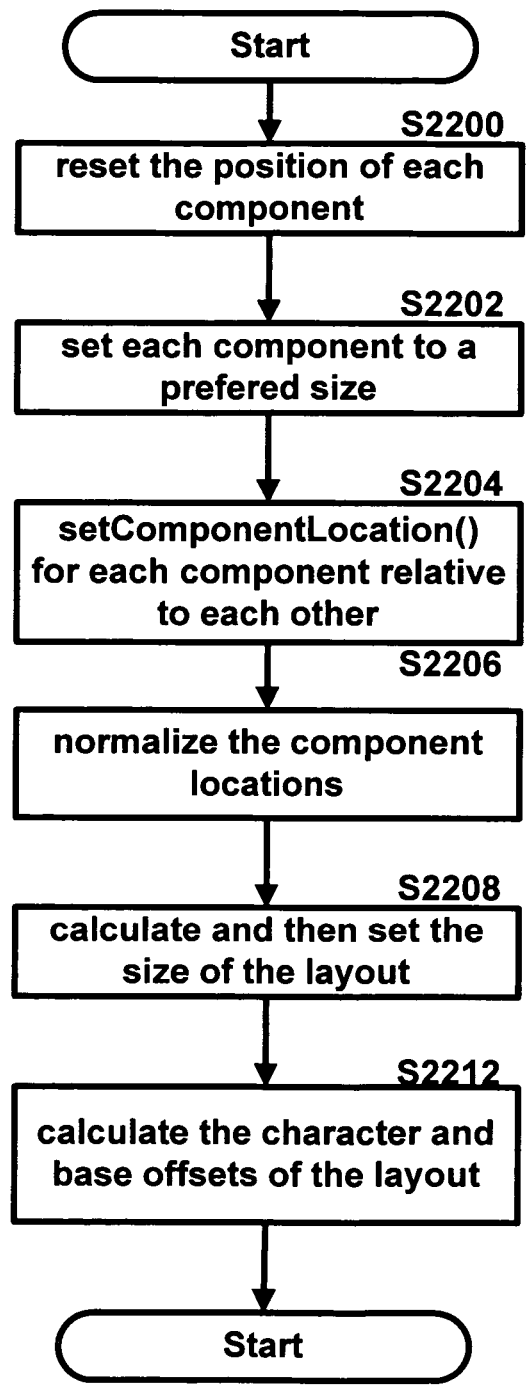
FIG. 22 is a flow diagram of the layout manager laying out a layout object.

FIG. 22 is a flow diagram of the layout manager laying out a layout object. Step S2200 resets the position of each component in the layout to a known position. Step S2202 then sets each component to its preferred size. If a component uses a layout manager such as the relative layout manager it may be laid out in step S2202 (by recursively calling the present algorithm) so that its preferred size may be determined. Step S2204 may set the location of each component relative to the other components. Step S2206 normalizes the component locations so components with the smallest X and Y coordinates are positioned at zero. Step S2208 then calculates the size of the layout based on the normalized positions and the maximum X and Y coordinate positions. Step S2212 then calculates the character and base offsets of the layout, which may be used by layout managers at higher levels in a nested layout manager hierarchy.

Figure 23:
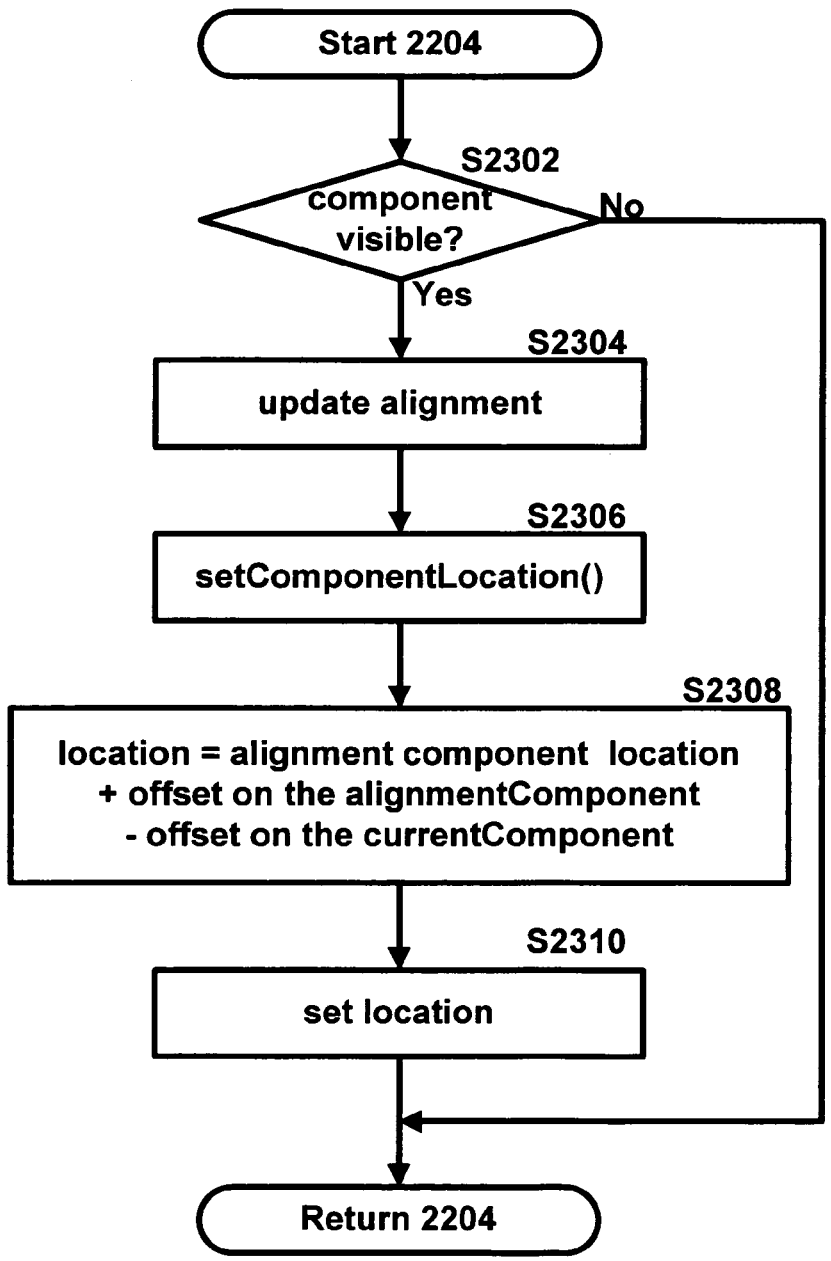
FIG. 23 a flow diagram showing an algorithm to set a component location.

FIG. 23 is an expansion of step S2204 showing a flow diagram of an embodiment of an algorithm to set a component location. Step S2302 determines whether the component is visible. If the component is not visible its position is not set and the algorithm returns. If the component is visible then step S2304 updates the relative alignment constraints 1920 for the component, which may find a component with the name specified in 1923 and may save a pointer to the component in 1924. Step S2306 may set the location of the alignment component by recursively calling the present algorithm. Next, step S2308 calculates the location of the current component by adding the offset on the alignment component to the current component's location and subtracting the offset on the current component. Step S2310 then moves the component to the new location.

Figure 24:
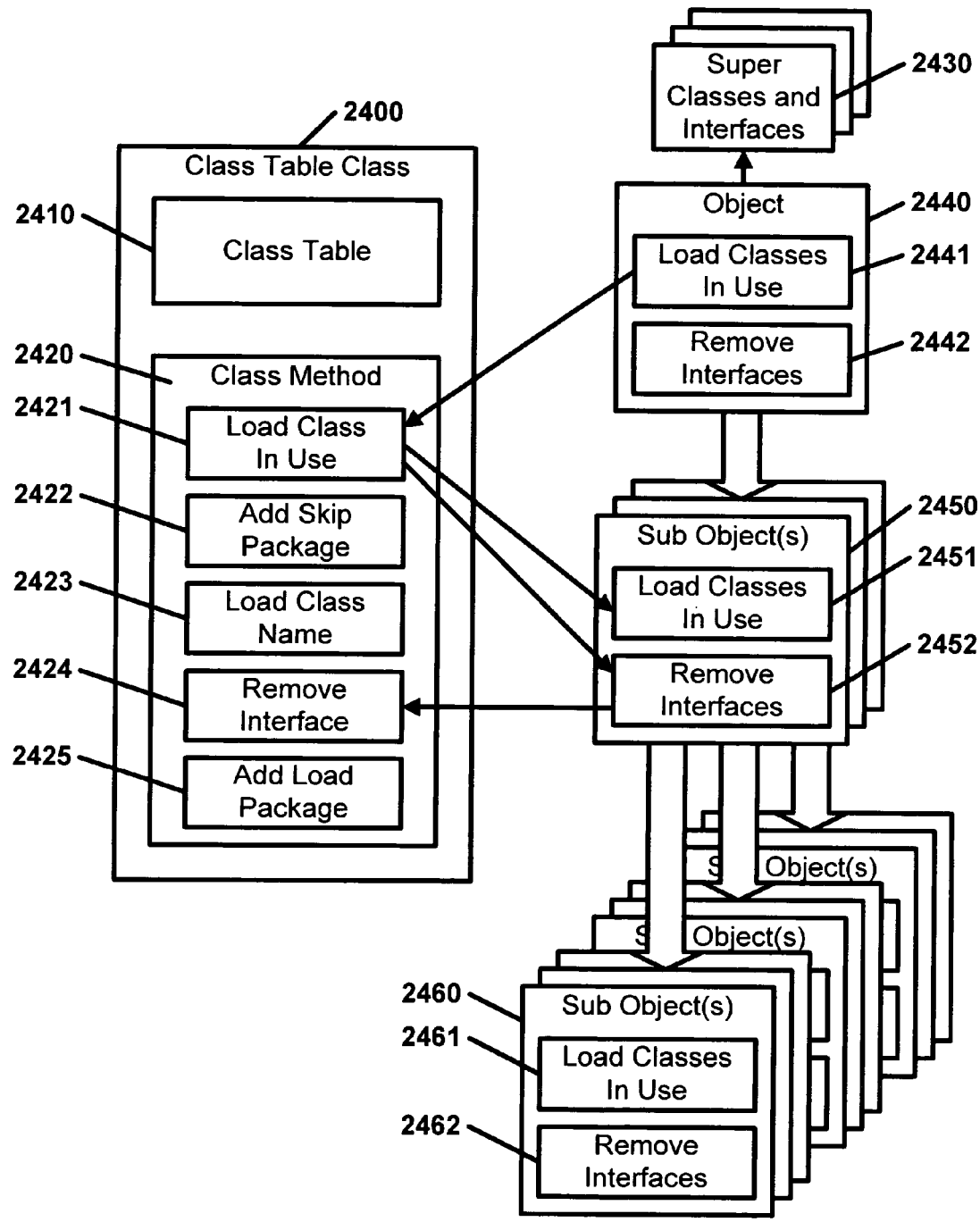
FIG. 24 is a block diagram showing a class table and class usage.

FIG. 24 is a block diagram showing a class table and class usage. A class table 2400 may be used to build a table of all the classes that may be used or referenced in an object hierarchy. The class table class 2400 contains a class table 2410 to hold the list of classes and several methods that may assist in building the class table. These methods may include a load class in use method 2421, an add skip package method 2422, a load class name method 2423, a remove interfaces method 2424, and an add load package method 2425. An object 2440 may have super classes and interfaces 2430 and subclasses 2450. Any subclasses 2450 may have further subclasses 2460. Each object may implement the ClassUsage interface which may indicate that the class contains load classes in use methods (2441, 2451, and 2461), and remove interfaces methods (2442, 2452, 2462). The load classes in use method 2441 may pass a sub object 2450 to the load class in used method 2421. The load class in use method 2421 may then call the sub object 2450's load classes in use 2451 and remove interfaces 2452 methods. The remove interfaces method 2452 may then call the remove interface method 2424. This process may continue recursively as each object in the object hierarchy may pass its sub objects to the load class in use method 2421. In this way all of the classes used in an object hierarchy may be added to the class table. The remove interfaces methods (2442, 2452, 2462) and remove interface method 2424 may specify interfaces implemented by objects that should not be included in the class table. The add skip package method 2422 may specify package names of classes that should be skipped and not added to the class table. The add load package method 2425 may specify package names of classes that should be loaded into the class table. The load class name method 2423 may specify explicit class names that should be added to the class table.

Figure 25:
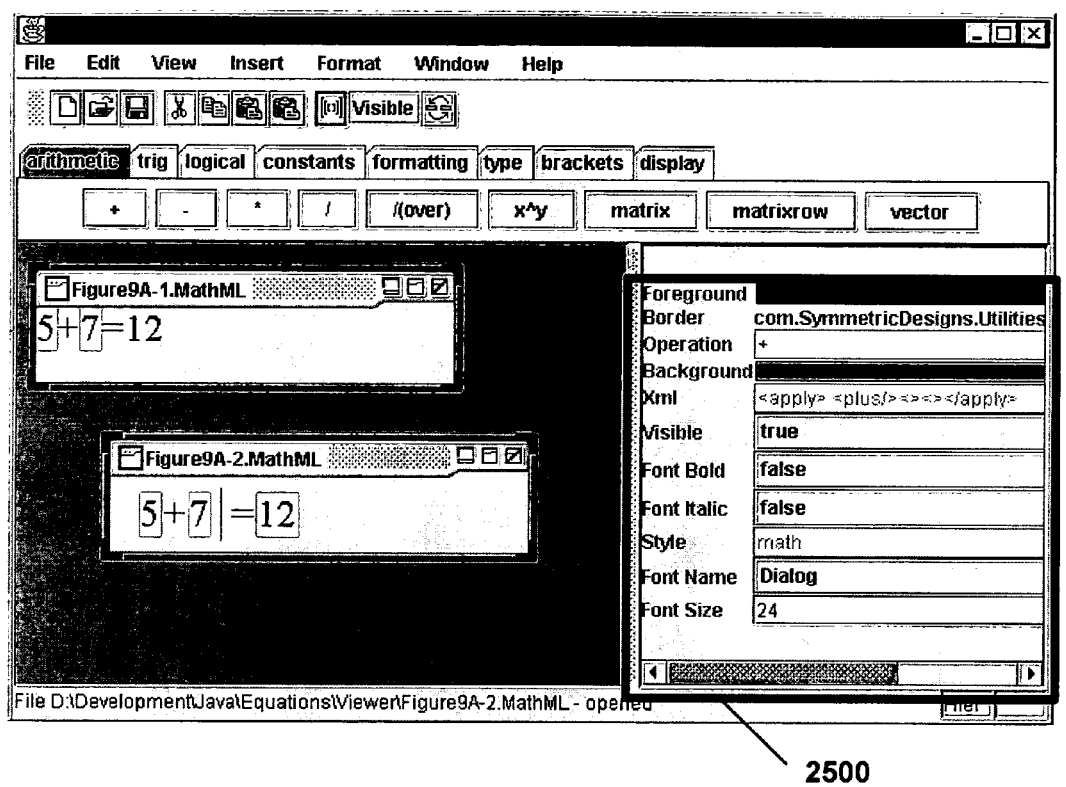
FIG. 25 is a screen shot of a property panel.

FIG. 25 is a screen shot showing a property panel 2500.

Figure 26:
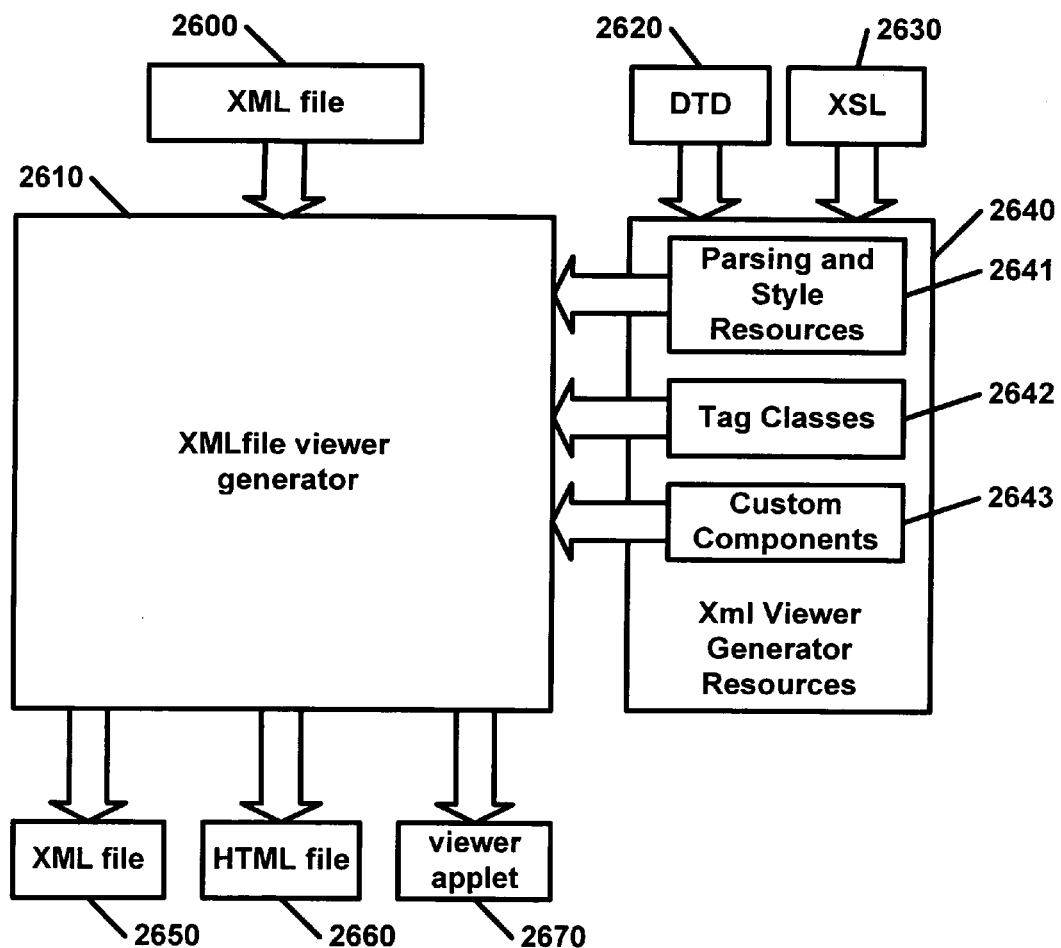
FIG. 26 is a block diagram of an embodiment of the present invention which generates custom XML viewer and related files.

FIG. 26 is a block diagram of an embodiment of the present invention which generates custom XML viewers and related files. An XML viewer generator 2610 may generate an XML file 2650, an HTML file 2660, and a viewer applet 2670. The XML viewer generator 2610 may accept an existing XML file 2600 as input and may contain, or be used in conjunction with, an XML editor. The XML viewer generator 2610 may further accept XML Viewer Generator Resources 2640 as input to direct the creation of the viewer applet 2670. The XML viewer generator resources 2640 may contain parsing and style resources 2641, tag classes 2642, and custom components 2643. The parsing and style resources 2641 may contain resources trees (described below in FIG. 29) which may direct XML parsing, and applet viewer formatting and style. The tag classes 2642 may contain modules, which may be JAVA, to handle the creation of components of the viewer applet 2670 specific to a particular XML tag in the XML file 2650. The custom components 2643 may contain JAVA classes for possible inclusion in the viewer applet 2670. Custom components 2643 may contain classes which may internally represent and display XML nodes (described above in FIG. 6), may further contain conversion classes (described above in FIG. 13), and operation classes (described above in FIG. 12). The XML viewer generator resources 2640 may be manually or automatically created, and may be created from a DTD 2620 and an XSL file 2630. The viewer applet 2670 may display the XML file 2600 with "live" or "static" components. Multiple XML viewers may be combined into a single viewer. Components of the viewer applet 2670 may also be integrated with other software such as a browser or other applet viewer.

Figure 27:
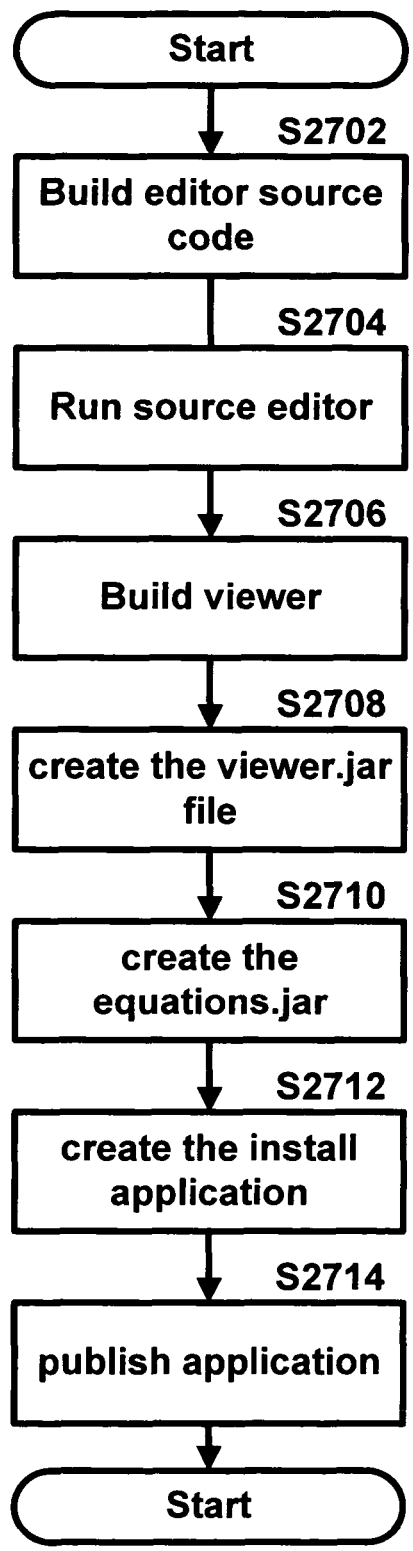
FIG. 27 is a flow diagram of a build procedure used to create an embodiment of the present invention.

FIG. 27 is a flow diagram of a build procedure used to create an embodiment of the present invention. In S2702 the editor source code 200 is built. Next in S2704 the source editor 230 is run which creates the viewer source code 210. In S2706 the viewer source code 210 is built and in S2708 the viewer .JAR file 280 is created. In S2710 the editor .JAR file 270 is created. Next, in S2712 the install application is created, and in S2714 the install application is published.

Figure 28:
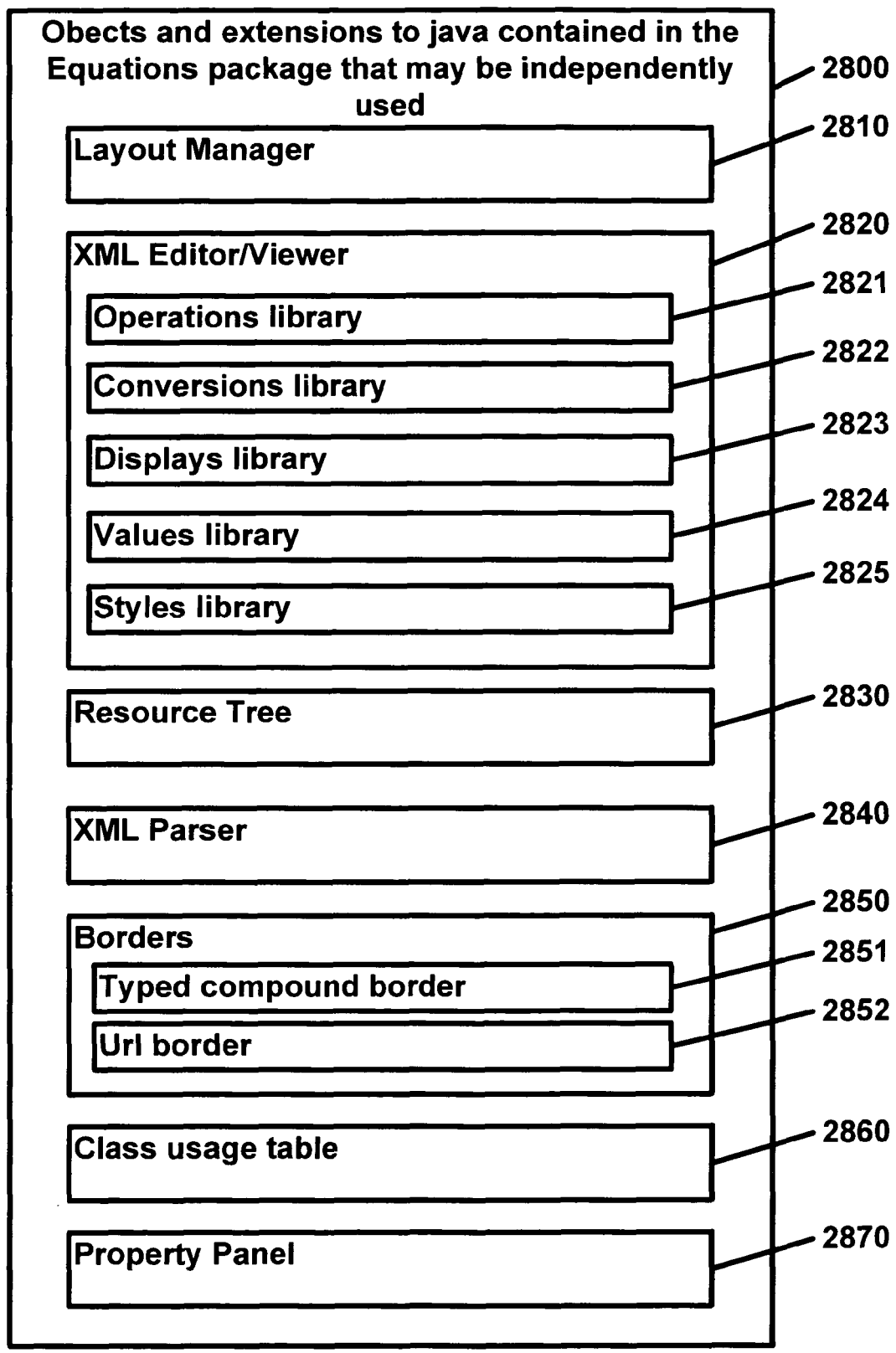
FIG. 28 is a block diagram showing components included in an embodiment of the present invention.

FIG. 28 is a block diagram showing components included in an embodiment of the present invention. Objects and extensions to JAVA that may be independently used 2800 may contain a layout manager 2810 (described above in FIGS. 18 through 23), an XML editor/viewer 2820, a resource tree 2830 (FIG. 29), an XML parser 2840 (FIGS. 14 through 17), component borders 2850 (FIG. 32), a class usage table 2860 (FIG. 24), and a property panel 2870. The XML editor/viewer 2810 may further contain an operations library 2821 (FIG. 12), a conversions library 2822 (FIG. 13), a displays library 2823 (FIG. 6), a values library 2824 (FIG. 33), and a styles library 2825. The components borders 2850 may further contain a typed compound border 2851 (FIG. 32), and a URL border 2852.

Figure 29:
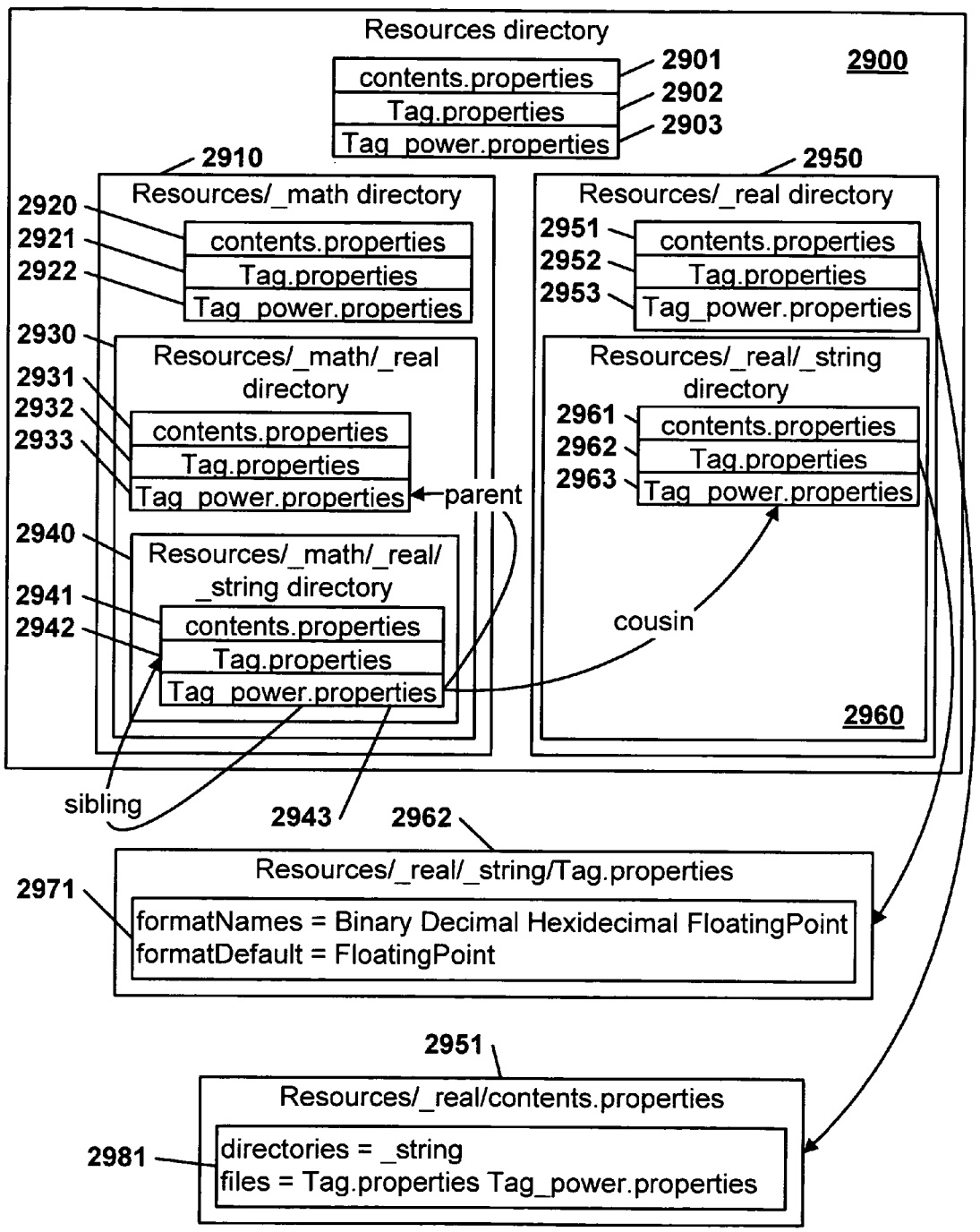
FIG. 29 is a block diagram of an example resource tree as used by an embodiment of the present invention.

FIG. 29 is a block diagram of an example resource tree as used by an embodiment of the present invention. A resource tree is shown that contains examples of various properties that may be used by an exponent operation (Tag_power). The directory structure of the example resource tree is shown in 2900. The top-level resources directory 2900 contains a subdirectory 2910 named "_math" and a subdirectory 2950 named "_real". The subdirectory 2910 further contains a subdirectory 2930 named "_real" that further contains a subdirectory 2940 named "_string". The subdirectory 2950 further contains a subdirectory 2960 named "_string". Each directory and subdirectory in the present example contain three properties files, contents.properties (2901, 2920, 2931, 2941, 2951, 2961), Tag.properties (2902, 2921, 2932, 2942, 2952, 2962), and Tag_power.properties (2903, 2922, 2933, 2943, 2953, 2963).

Properties files at each level of the resource tree may inherit properties from their sibling, parent, and cousin properties files. A sibling properties file may be a properties file at the same directory level with the last section of the name removed. In the present example the Tag_power.properties file 2943 has a sibling properties file Tag.properties 2942. A parent properties file may be a properties file in the parent directory level with the same name. In the present example the Tag_power.properties file 2943 has a parent properties file Tag_power.properties 2933. A cousin properties file may be a properties file in the directory level with the same directory path with the highest level directory level removed. In the present example the Tag_power.properties file 2943 has a cousin properties file Tag_power.properties 2963.

The contents.properties files may contain a list of directories and files contained in the same directory. Contents.properties file 2951 may contain properties 2981 which may include a "directories" property set to the name of the "_string" subdirectory and a "files" property set to the names of the Tag.properties and Tag_power.properties files. The contents.properties file 2951 may be used to determine the files contained in the directory structure 2950 without the need for potentially slow or unnecessary network requests. Tag.properties file 2962 is an example of some properties 2971 that may be in a properties file. These properties may include formatNames listing the names of allowable display formats, and formatDefault indicating the default display format.

Figure 30:
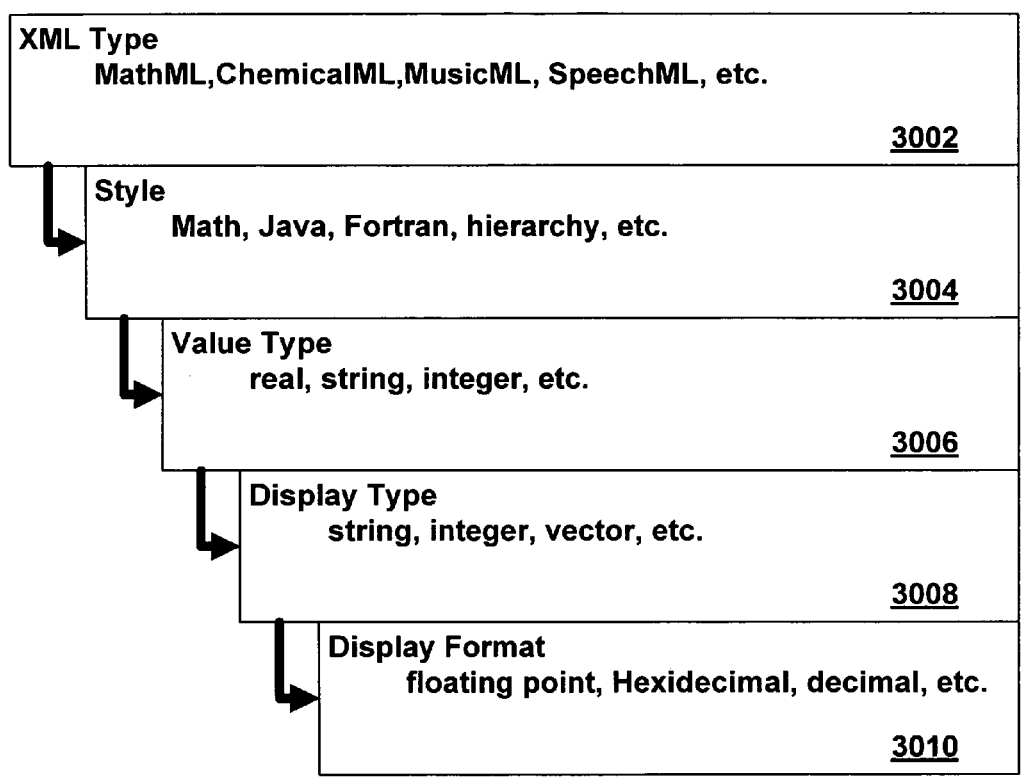
FIG. 30 is a resource hierarchy diagram as per an embodiment of the present invention.

FIG. 30 is a resource hierarchy diagram as per an embodiment of the present invention. The diagram shows one branch of a resource hierarchy. Each level of the hierarchy may more finely describe a particular XML node and may contain resources to control and display that node. The highest level of the resource hierarchy is the XML type 3002, which may indicate the particular type of XML (MathML, ChemicalML, MusicML, SpeechML, etc.) contained in that branch of the hierarchy. A style 3004 level of the hierarchy may indicate a particular display style (Math, Java, Fortran, hierarchy) for the current XML type 3002. A value type 3006 level of the hierarchy indicates the type of data (such as real, string, integer.) represented by an XML node. A display type 3008 level of the hierarchy indicates the type of data (such as string, integer, vector) used to display an XML node. A display format 3010 level of the hierarchy indicates the display format of a displayed XML node. Various formats may be implemented, such as different ways to represent a binary value including Intel format, Motorola format, Hexadecimal format, octal format, or binary format.

Figure 31:
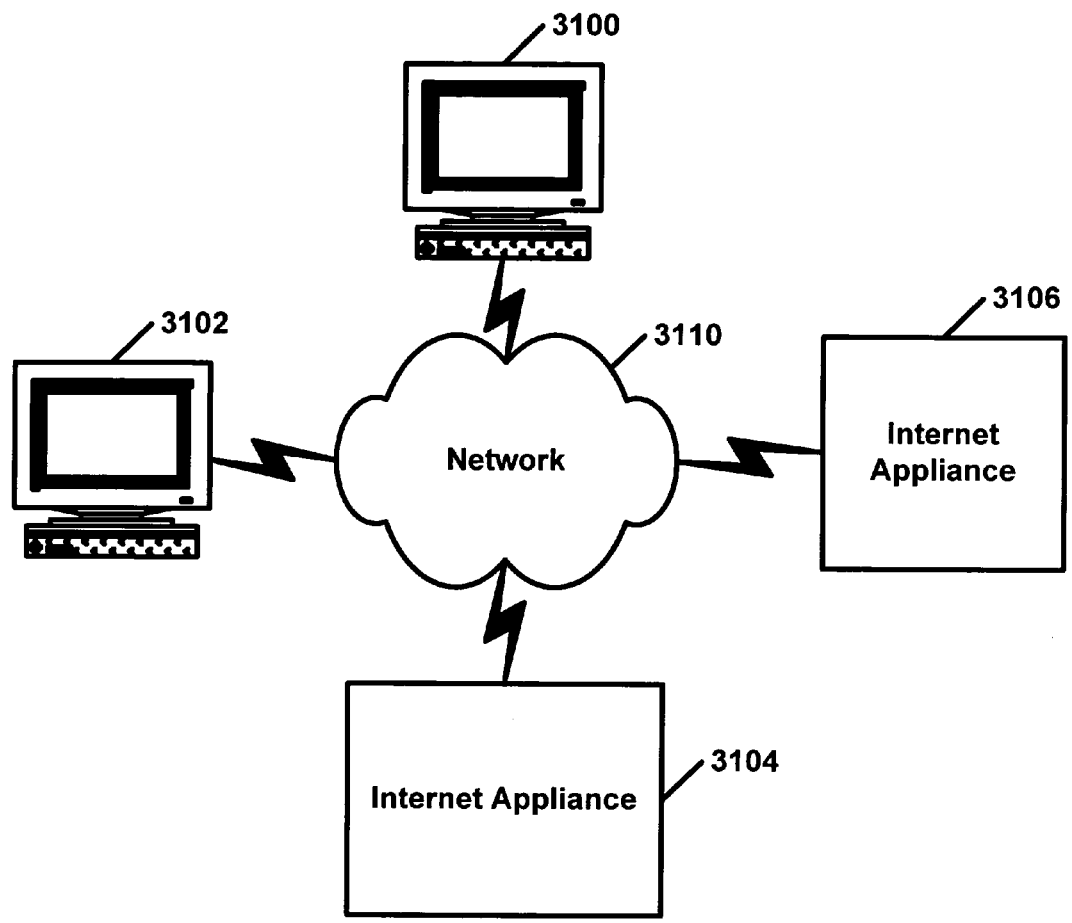
FIG. 31 is a block diagram showing embodiments of the present invention interacting over a network.

FIG. 31 is a block diagram showing embodiments of the present invention interacting over a network. Live components may exist on various nodes of a network. It is a feature of the live components that they may reference each other by data links. Data links may include locations to either receive or transmit data. The location may be identified by any network addressing scheme such as URL's. This data may include values such as numeric values, text values, and link values. These values may be a dynamically calculated per an algorithm performed by the live component. For example, a link's values may change dynamically based on the algorithm performed by the live component.

Also, live components may be downloaded to different nodes by reference. For example, a web page may include a live component which gets loaded on the browser of a site connected to the web page. In the present illustration, computer 3102, computer 3100, internet appliance 3104 and internet appliance 3106 are nodes on the network 3100. Live components may run on a computer or an internet appliance. Live components may be used to control or report the status of an internet appliance.

Figure 32:
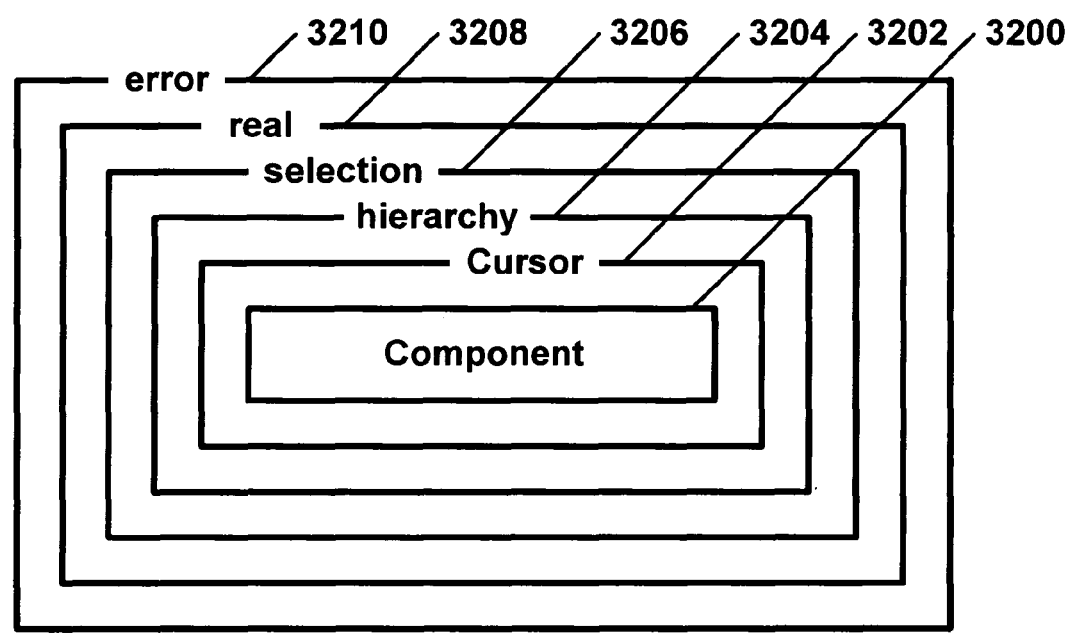
FIG. 32 is a block diagram showing typed compound borders.

FIG. 32 is a block diagram showing typed compound borders. A typed compound border may be a border on a component 3200. The typed compound border may contain other typed compound borders in a nested border hierarchy. The typed compound borders may be assigned a border type including error border type 3210, real border type 3208, selection border type 3206, hierarchy border type 3204, and cursor border type 3202. The border hierarchy may be restricted to one compound border of a particular type and the hierarchy may further be restricted to a particular border type order. When a new compound border is inserted in a border hierarchy it may be inserted into the hierarchy in a position that adheres to the restricted order, and may also replace an existing border if one already exists in the border hierarchy of the same border type. Real border types may represent a border around an element of a live component and may include bracket borders (such as square brackets, parenthesis brackets, and squiggle brackets), beveled borders, etched borders, lined borders, titled borders and URL borders. Selection border types may represent currently selected elements in a live component hierarchy (typically used to designate which elements a command will apply to). Hierarchy borders may be used to indicate visually the hierarchy of a live component which otherwise may not be visible. Cursor border types may be used to indicate the current insertion point while editing a live component.

Figure 33:
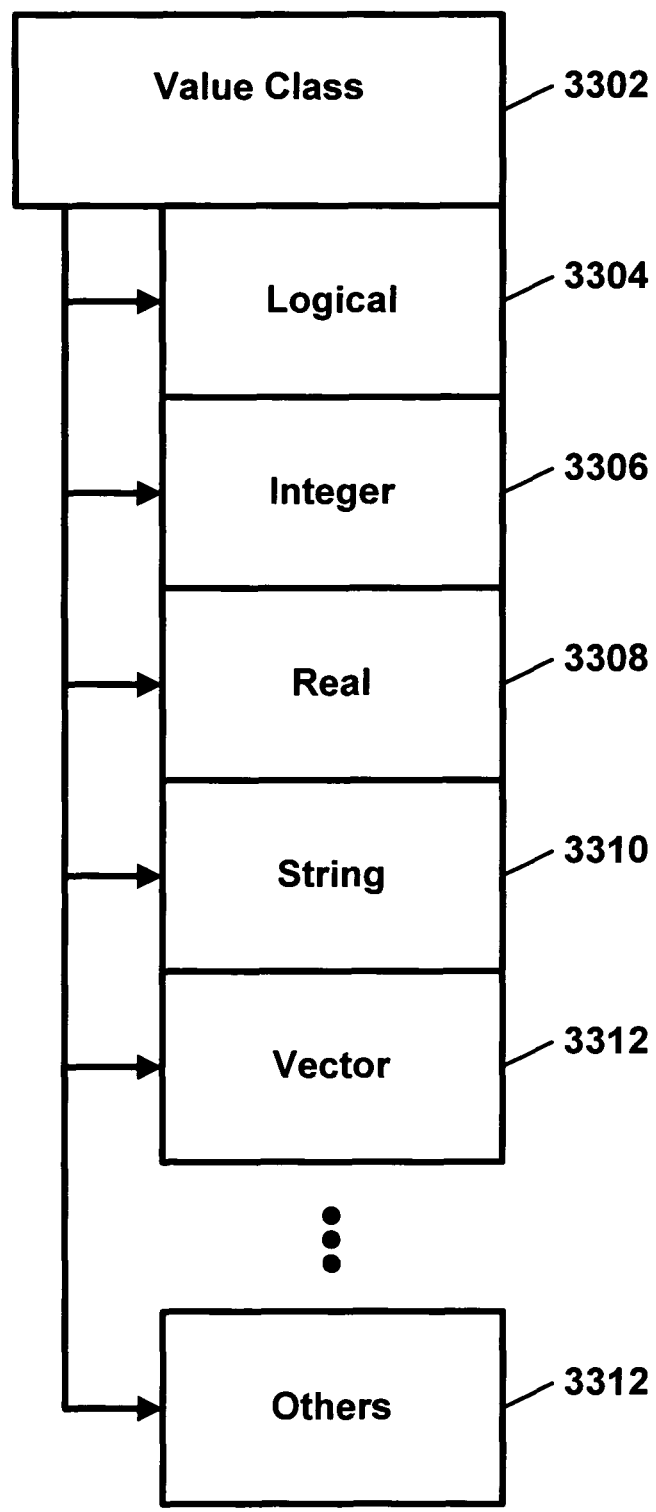
FIG. 33 is a class hierarchy diagram of value classes that may be used to represent a value in a live component.

FIG. 33 is a class hierarchy diagram of the value classes that may be used to represent a value object(s) in a live component hierarchy. A value object holds a data value which may be of various types including logical, integer, real, string, vector, URL, error tracking, and infinite precision. A value class 3302 may contain modules that may be included in all subclasses of value class 3302. The value class 3302 may be sub classed by a logical value 3304, an integer value 3306, a real value 3308, a string value 3310, a vector value 3312, and other values 3314. Each subclass may contain an internal representation of a value in a live component and other methods specific to the type of data being represented.

Figure 34:
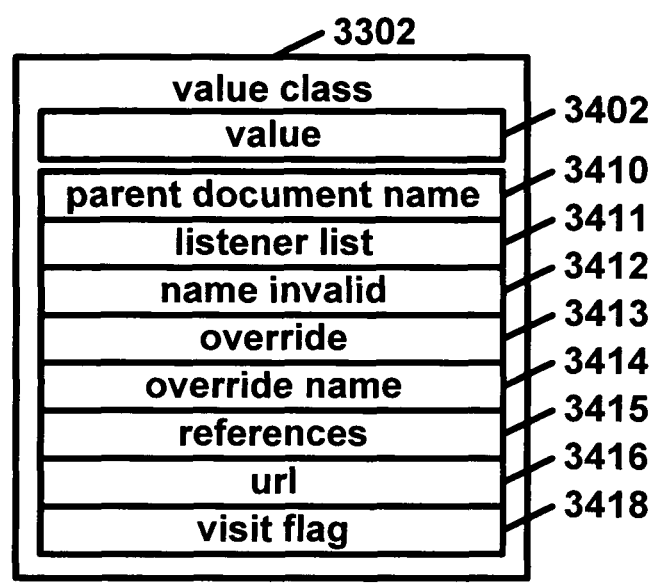
FIG. 34 is a diagram of components that subclasses of a value class may contain.

FIG. 34 is a diagram of some components that all subclasses of value class 3302 may contain. These components may include a value 3402 used to hold a value's internal representation (Boolean, long, double, String, Vector, etc.), a parent document name 3410 indicating the XML document the value is contained in, a listener list 3411 containing any object that may be notified when the value changes, a name invalid 3412 flag indicating the value's name is not valid and must be updated, an override 3413 and override name 3414 containing another value and its name if the current value has been overridden (is a variable), a references table 3415 containing a list of other values that are overridden by this value (linked variables), a URL 3416 indicating that this values internal representation should be obtained from a network, and a visit flag 3418 indicating that this value is currently being accessed or computed.

Figure 35:
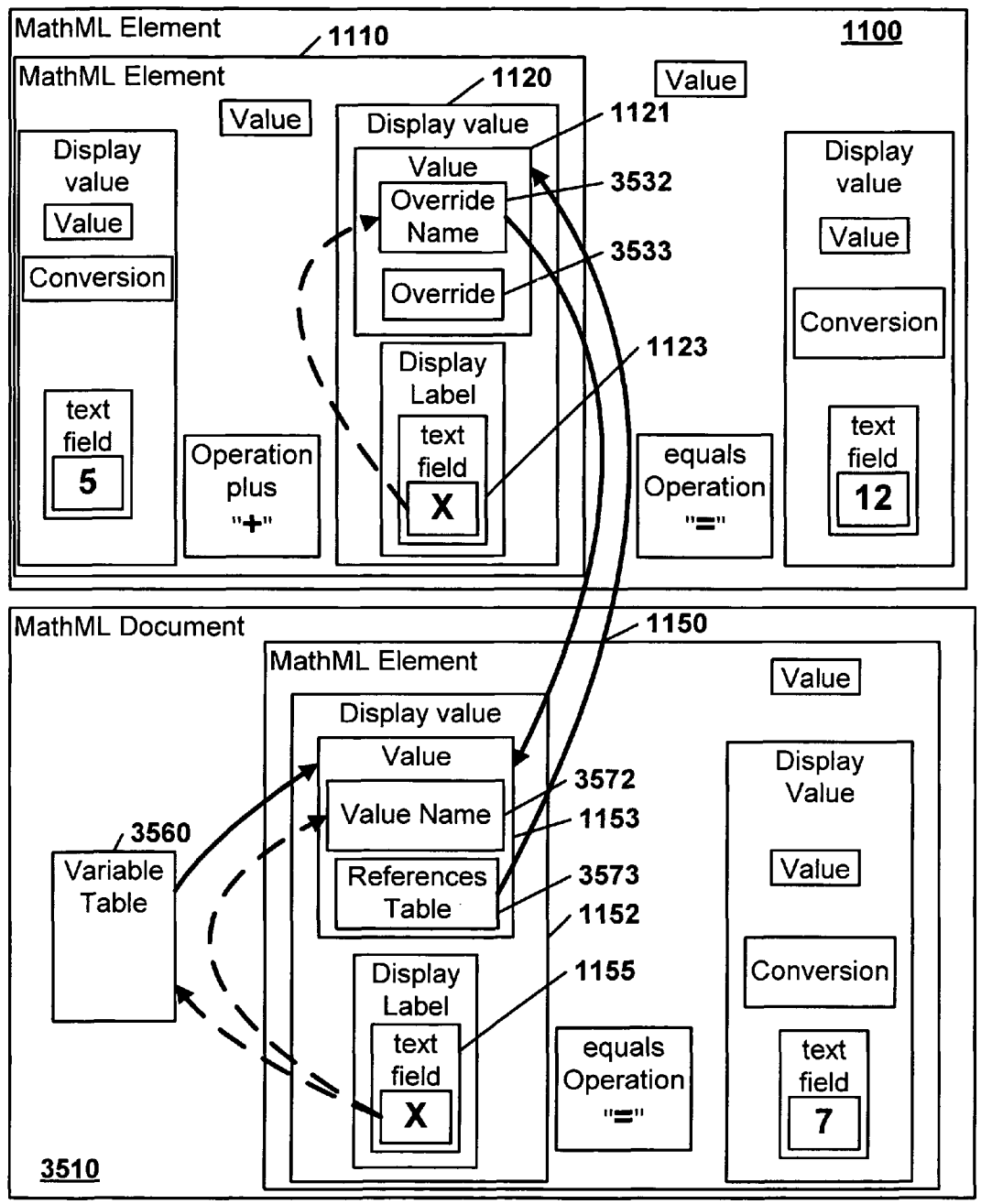
FIG. 35 is an expansion of FIG. 11 showing multiple equations sharing a variable.

FIG. 35 is an expansion of FIG. 11 showing multiple equations sharing a variable. The display value 1152 contains an attribute "source" set to "true" which indicates that it is the source of the variable's value. The display value 1120 does not contain a "source" attribute so its value is overridden by the variable. The value 1153 is the value of the variable and contains the value name 3572 ("X" as specified by text field 1155) and a reference table 3573 which lists all references to the variable "X". In the present example the reference table 3573 contains an entry for Value 1121. Value 1121 contains an override name 3532 which holds the name of the override value ("X") and the override 3533 which points at value 1153. Text field 1123 specifies the value of override name 3532. A MathML document 3510 contains the MathML element 1150 and also a variable table 3560 that contains a list of all of the variables defined in the document. In the present example the variable table 3560 contains one entry for the value 1153 indexed by its name "X". When the override name 3532 is set the variable table 3560 is scanned for a value of the same name and that value is placed in override 3533. Also when the variable name 3572 is set the value is added to the variable table 3560 and any references to the value 3572 listed in the reference table 3573 have their override name 3532 and override 3533 changed.

Figure 36:
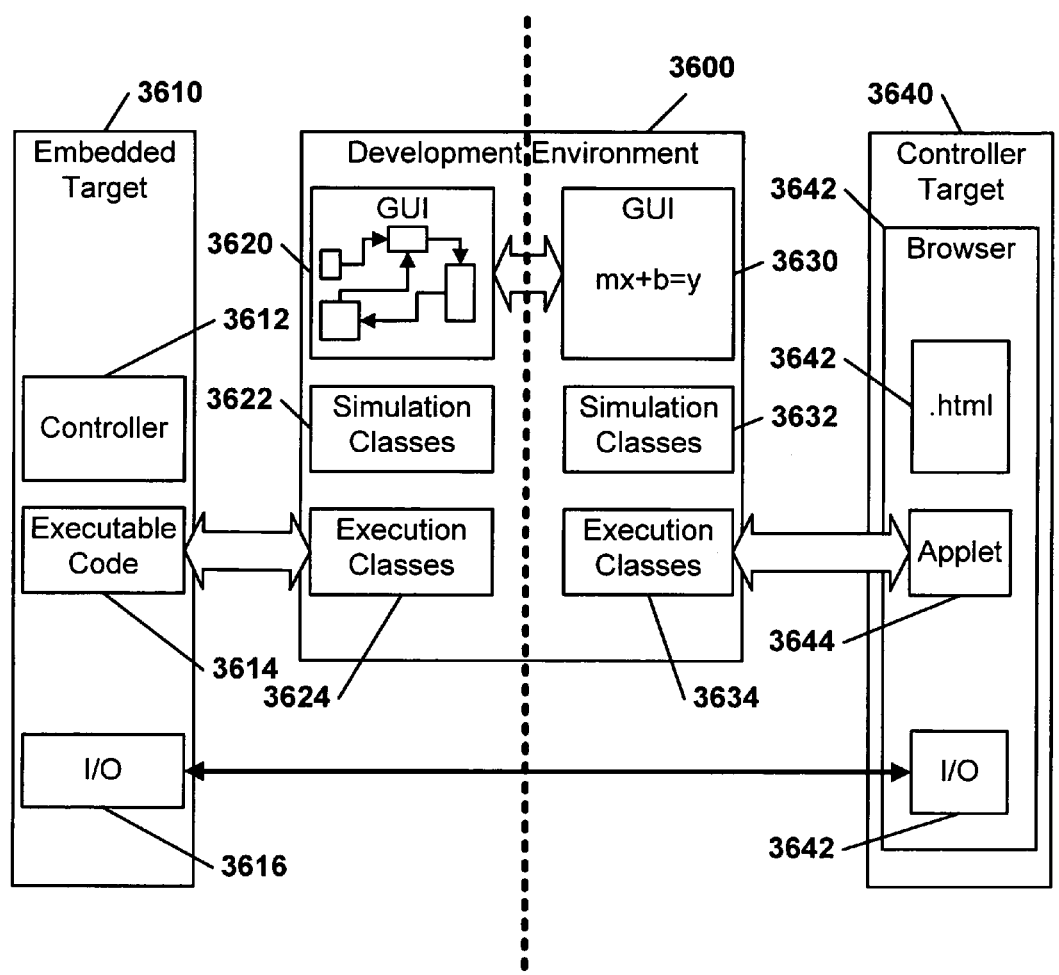
FIG. 36 shows a development environment containing an embedded system.

FIG. 36 shows a development environment containing an embedded system. An embedded target 3610 may contain a controller 3612, executable code 3614, and I/O 3616. The controller target 3640 may contain a browser 3642 that further contains an HTML file 3642, an applet 3644, and I/O 3642. The development environment 3600 contains a GUI editor 3620, simulation classes 3622, and execution classes 3624 which together are used to create and simulate algorithms and executable code 3614. The development environment 3600 further contains a GUI editor 3630, simulation classes 3632, and execution classes 3634 which together are used to create and simulate an applet 3644. The interaction of the embedded target 3610 and the controller target 3640 may be simulated in the development environment 3600. When the desired operation of the algorithms represented in the GUI editor 3620 and the controller live components represented in the GUI editor 3630 is reached, the developers environment 3600 creates the executable code 3614 and the applet 3644 which may be transferred to the embedded target 3610 and the controller target 3640.

The present invention may have numerous potential applications. Applications may include but are not limited to interactive electronic texts; live web pages; live URL linking; mathematics; command and telemetry; live documents; timesheets; financial reports; mathematics calculations; simulations; embedded systems; command and control; embedded code generation; system modeling; extending XML to include live components; MathML; MusicML; ChemicalML; business to business application linking; automated data transfer; local calculations; intelligent data entry; and generation and distribution of electronic documents with encapsulated viewer(s).

Although the present invention has been fully described by way of examples with reference to the accompanying drawings, it is to be noted that various changes and modifications will be apparent to those skilled in the art. For example, the present invention discusses creating live equations for use on web applications. One skilled in the art will recognize that live equations may be used on any type of computing device, whether or not is connected to a network. Therefore, unless such changes and modifications depart from the scope of the present invention, they should be construed as being included therein.

We claim:

1. A non-transitory computer-readable storage media having instructions stored therein that, when executed by a computer, cause the computer to provide a live component for one or more displayable equation elements having user-edited format characteristics by performing contents configured to cause a computer to perform operations comprising:
   receiving a first live component comprising a first viewer module and a first component description file, wherein the first viewer module and first component description file define a set of displayable equation elements;
   executing an editor to:
      display a subset of the displayable equation elements;
      receive user input to invoke at least one rule in a pre-built application, the pre-built application included in the first viewer module, and the invoked at least one rule related to editing the format of equation elements, wherein the at least one rule edits the format of at least one element in the displayed subset of displayable equation elements to indicate a new format for edited elements; and
      generate and display, based on the invoked at least one rule, the edited elements including the indicated new format;
   receiving edited displayable equation elements from the editor and generating a second component description file that includes items describing the content and the modified format of the edited displayable equation elements;
   generating a second viewer module that includes the pre-built application module used by the editor, rendering instructions, and equation evaluation instructions; the second viewer module executable in a browser to evaluate, render, or edit the elements in the second component description file; and generating a second live component comprised of the second viewer module and the second component description file, the second live component executable on a server or downloadable to a local system to display a component with the content and the modified format of the edited displayable equation elements according the second component description file, or further edit the format of the second live component using rules from the pre-built application module in the second viewer module.

2. The computer-readable storage media as recited in claim 1, wherein at least one of a rendering instruction or an equation evaluation instruction of the second viewer module is executable by the additional computer system to display a version of the equation.

3. The computer-readable storage media as recited in claim 1, wherein at least the first or second viewer module includes at least one of an interpreted script or a Java script.

4. The computer-readable storage media as recited in claim 1, wherein at least the second component description file includes equation instructions to receive a value for a displayable equation element.

5. The computer-readable storage media as recited in claim 1, wherein the first and second component description files include at least one of mathematic markup language, a Uniform Resource Locator, or extensible markup language.

6. The computer-readable storage media as recited in claim 1, wherein at least one of the rendering instructions or equation evaluation instructions in the second viewer module is created using a rule in the pre-built application module.

7. The computer-readable storage media as recited in claim 1, further comprising layout manager instructions to assign positions for displayable equation elements relative to each other, the layout manager instructions repositioning elements of a displayed subset of the displayable equation elements to new positions according to edits by user input in an editing browser interface, the layout manager instructions defining the new positions in terms of relative positioning between the displayable equation elements.

8. The computer-readable storage media as recited in claim 7, wherein the layout manager instructions further position or reposition, the displayable equation elements relative to each other without constraint of a grid layout.

9. The computer-readable storage media as recited in claim 7, wherein the layout manager instructions further position or reposition, the displayable equation elements relative to each other based on an alignment coordinate system that includes layout alignment positions and measurement values corresponding to the displayable equation elements.

10. A computer-implemented method for authoring a live component for one or more displayable equation elements having user-edited format characteristics, the method comprising:

receiving a live component comprising a viewer module and a component description file, wherein the viewer module and component description file define a set of displayable equation elements;

displaying a subset of the displayable equation elements in an editing browser interface;

receiving user input to the editing browser interface, causing:

invocation of at least one rule in a pre-built application, the pre-built application included in the viewer module, and the invoked at least one rule related to editing the format of equation elements, wherein the at least one rule edits the format of at least one element in the displayed subset of the displayable equation elements to indicate a new format for edited elements; and generation and display, based on the invoked at least one rule, of the edited elements including the indicated new format;

receiving edited displayable equation elements from the editor and modifying the live component by changing the component description file to include items describing the content and the modified format of the edited displayable equation elements;

wherein the live component, after being modified, is executable on a server or downloadable to a local system to display a component with the content and the modified format of the edited displayable equation elements according the changed component description file, or to further edit the format of the live component using rules from the pre-built application module in the viewer module.

11. The computer-implemented method as recited in claim 10, further comprising executing at least one of a rendering instruction or an equation evaluation instruction of the viewer module to display the version of the equation.

12. The computer-implemented method as recited in claim 10, wherein the viewer module includes at least one of interpreted script or a Java script.

13. The computer-implemented method as recited in claim 10, wherein the component description file includes instructions to receive a value for a displayable equation element.

14. The computer-implemented method as recited in claim 10, wherein the component description file includes at least one of mathematic markup language or a Uniform Resource Locator.

15. The computer-implemented method as recited in claim 10, further comprising receiving at least one element in the set of displayable equation elements as a numeric value from an additional user input via a data network.

16. The computer-implemented method as recited in claim 10, wherein the displayable equation elements are positioned or repositioned, relative to each other without constraint of a grid layout.

17. The computer-implemented method as recited in claim 10, wherein the displayable equation elements are positioned or repositioned, relative to each other based on an alignment coordinate system that includes layout alignment positions and measurement values corresponding to the displayable equation elements.

18. The computer-implimented method as recited in claim 10, wherein at least one of the rendering instructions or equation evaluation instructions in the viewer module is created using a rule in the pre-built application module.

19. A computer system, comprising:

at least a memory and a processor;

a receiving component configured to receive a live component comprising a viewer module and a component description file, wherein the viewer module and component description file define a set of displayable equation elements;

a display component configured to display a subset of the displayable equation elements in an editing browser interface, the editing browser interface configured to receive user input, and in response to the user input, causing:

invocation of at least one rule in a pre-built application, the pre-built application included in the viewer module, and the invoked at least one rule related to editing the format of equation elements, wherein the at least one rule edits the format of at least one element in the displayed subset of the displayable equation elements to indicate a new format for edited elements;

generation and display, based on the invoked at least one rule, of the edited elements including the indicated new format; and modification of the component description file in the live component to include the edited displayable equation elements;

wherein the live component, after being modified, is executable on a server or downloadable to a local system to display a component with the content and the modified format of the edited displayable equation elements according the changed component description file, or to further edit the format of the live component using rules from the pre-built application module in the viewer module.

20. The computer system as recited in claim 19, wherein the additional computer system to execute at least one of a rendering instruction or an equation evaluation instruction of the viewer module is executable at the additional computer system to display the version of the equation.

21. The computer system as recited in claim 19, wherein the input device includes a data network input configured to receive at least one element in the set of displayable equation elements as a numeric value from an additional user device via a data network.

22. The computer system as recited in claim 19, further comprising a layout manager configured to position or reposition, the displayable equation elements relative to each other without constraint of a grid layout.

23. The computer system as recited in claim 19, further comprising a layout manager configured to position or reposition, the displayable equation elements relative to each other based on an alignment coordinate system that includes layout alignment positions and measurement values corresponding to the elements in the set of displayable equation elements.

24. The computer system as recited in claim 19, wherein at least one of the rendering instructions or equation evaluation instructions in the viewer module is created using a rule in the pre-built application module.

25. A computer system, comprising:
at least a memory and a processor;
means for receiving a live component comprising a viewer module and a component description file, wherein the viewer module and component description file define a set of displayable equation elements;
means for displaying a subset of the displayable equation elements
means for receiving user input, and in response to the user input, causing:
invocation of at least one rule in a pre-built application, the pre-built application included in the viewer module, and the invoked at least one rule related to editing the format of equation elements, wherein the at least one rule edits the format of at least one element in the displayed subset of the displayable equation elements to indicate a new format for edited elements;

means for generating and displaying, based on the invoked at least one rule, the edited elements including the indicated new format;

means for modifying the component description file in the live component to include the edited displayable equation elements;

wherein the live component, after being modified, is executable on a server or downloadable to a local system to display a component with the content and the modified format of the edited displayable equation elements according the changed component description file, or to further edit the format of the live component using rules from the pre-built application module in the viewer module.

26. The A computer system as recited in claim 25, further comprising means for downloading the viewer module and the component description file of the live component to an additional computer system to render the version of the equation for display.

27. The computer system as recited in claim 25, further comprising means for downloading the viewer module and the component description file of the live component to a computer system to execute at least one of a rendering instruction or an equation evaluation instruction of the viewer module to render the version of the equation for display.

28. The computer system as recited in claim 25, further comprising means for receiving at least one element in the set of displayable equation elements as a numeric value from an additional user input via a data network.

29. The computer system as recited in claim 25, further comprising means for positioning or repositioning, the displayable equation elements to a new position, the new position of the displayable equation elements defined relative to each other without constraint of a grid layout.

30. The computer system as recited in claim 25, further comprising means for positioning or repositioning, the displayable equation elements to a new position, the new position of the displayable equation elements defined relative to each other based on an alignment coordinate system that includes layout alignment positions and measurement values corresponding to the displayable equation elements.

31. The computer system as recited in claim 25, wherein at least one of the rendering instructions or equation evaluation instructions in the viewer module is created using a rule in the pre-built application module.

* * * * *

UNITED STATES PATENT AND TRADEMARK OFFICE
CERTIFICATE OF CORRECTION

PATENT NO. : 8,504,988 B2
APPLICATION NO. : 11/376299
DATED : August 6, 2013
INVENTOR(S) : DeGroote et al.

It is certified that error appears in the above-identified patent and that said Letters Patent is hereby corrected as shown below:

On Title Page 2, in Item (56), under "OTHER PUBLICATIONS", in Column 1, Line 8, delete "MathM"," and insert -- MathML", --, therefor.

In the Drawings

In Fig. 2, Sheet 2 of 36, for Tag "208", in Line 1, delete "Utilitiy" and insert -- Utility --, therefor.

In Fig. 2, Sheet 2 of 36, for Tag "218", in Line 1, delete "Utilitiy" and insert -- Utility --, therefor.

In Fig. 2, Sheet 2 of 36, for Tag "278", in Line 1, delete "Utilites" and insert -- Utilities --, therefor.

In Fig. 2, Sheet 2 of 36, for Tag "288", in Line 1, delete "Utilites" and insert -- Utilities --, therefor.

In Fig. 22, Sheet 22 of 36, in Step "S2202", in Line 2, delete "prefered" and insert -- preferred --, therefor.

In the Specifications

In Column 3, Line 35, delete "of an MathML" and insert -- of a MathML --, therefor.

In Column 3, Line 38, delete "of a example" and insert -- of an example --, therefor.

In Column 3, Line 40, delete "of a example" and insert -- of an example --, therefor.

In Column 3, Line 43, delete "of a example" and insert -- of an example --, therefor.

In Column 3, Line 45, delete "of a example" and insert -- of an example --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,504,988 B2

In Column 4, Line 3, delete "system" and insert -- system. --, therefor.

In the Claims

In Column 18, Lines 41-42, in Claim 1, after "performing", delete "contents configured to cause a computer to perform".

In Column 18, Line 51, in Claim 1, delete "at the least one" and insert -- at least one --, therefor.

In Column 19, Line 4, in Claim 1, delete "comprised of" and insert -- comprising --, therefor.

In Column 20, Line 49, in Claim 18, delete "implimented" and insert -- implemented --, therefor.

In Column 21, Line 51, in Claim 25, delete "elements" and insert -- elements; --, therefor.

In Column 22, Line 22, in Claim 26, delete "The A computer" and insert -- The computer --, therefor.

UNITED STATES PATENT AND TRADEMARK OFFICE
CERTIFICATE OF CORRECTION

| | | |
|---|---|---|
| PATENT NO. | : 8,504,988 B2 | Page 1 of 1 |
| APPLICATION NO. | : 11/376299 | |
| DATED | : August 6, 2013 | |
| INVENTOR(S) | : DeGroote et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this
Twenty-seventh Day of January, 2015

Michelle K. Lee
*Deputy Director of the United States Patent and Trademark Office*